(12) United States Patent
Sato et al.

(10) Patent No.: US 12,415,137 B2
(45) Date of Patent: Sep. 16, 2025

(54) STORAGE MEDIUM, GAME SYSTEM, GAME APPARATUS, AND GAME PROCESSING METHOD

(71) Applicant: NINTENDO CO., LTD., Kyoto (JP)

(72) Inventors: Katsuhisa Sato, Kyoto (JP); Haruki Sato, Kyoto (JP); Yuya Sato, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 224 days.

(21) Appl. No.: 18/240,665

(22) Filed: Aug. 31, 2023

(65) Prior Publication Data

US 2024/0082736 A1 Mar. 14, 2024

(30) Foreign Application Priority Data

Sep. 12, 2022 (JP) ................. 2022-144909

(51) Int. Cl.
*A63F 13/69* (2014.01)
*A63F 13/42* (2014.01)
*A63F 13/537* (2014.01)
*A63F 13/822* (2014.01)

(52) U.S. Cl.
CPC ............. *A63F 13/69* (2014.09); *A63F 13/42* (2014.09); *A63F 13/537* (2014.09); *A63F 13/822* (2014.09)

(58) Field of Classification Search
CPC .......... A63F 13/42; A63F 13/45; A63F 13/69; A63F 2300/537
See application file for complete search history.

(56) References Cited

U.S. PATENT DOCUMENTS

| | | | | |
|---|---|---|---|---|
| 6,270,416 B1* | 8/2001 | Komoto | ............... | A63F 13/10 463/43 |
| 6,283,861 B1* | 9/2001 | Kawai | ............... | A63F 13/57 463/43 |
| 6,306,033 B1* | 10/2001 | Niwa | ............... | A63F 13/10 463/31 |
| 7,594,847 B1* | 9/2009 | York | ............... | A63F 13/48 463/2 |
| 2002/0045470 A1* | 4/2002 | Atsumi | ............... | A63F 13/10 463/9 |
| 2004/0157662 A1* | 8/2004 | Tsuchiya | ............ | A63F 13/5378 463/32 |
| 2005/0143174 A1* | 6/2005 | Goldman | ............ | A63F 13/822 463/40 |

(Continued)

FOREIGN PATENT DOCUMENTS

JP H11156053 A 6/1999
JP 2004-195166 7/2004

(Continued)

*Primary Examiner* — Steve Rowland
(74) *Attorney, Agent, or Firm* — Nixon & Vanderhye PC

(57) ABSTRACT

A first character disposed is controlled based on an operation input, and a second character is controlled automatically, in a first mode. The second character is controlled based on an operation input in a second mode. The control of the first character includes at least performing an attack action using a combination weapon object generated by combining a weapon object with an item object. The control of the second character includes at least performing an attack action using an item object attached to a part of the second character.

24 Claims, 23 Drawing Sheets

(56) References Cited

U.S. PATENT DOCUMENTS

| | | | |
|---|---|---|---|
| 2005/0164794 A1* | 7/2005 | Tahara | A63F 13/426 |
| | | | 463/43 |
| 2005/0181849 A1* | 8/2005 | Kobayashi | A63F 13/45 |
| | | | 463/7 |
| 2007/0225073 A1* | 9/2007 | Ishii | A63F 13/69 |
| | | | 463/31 |
| 2008/0113798 A1* | 5/2008 | Miyanaga | A63F 13/211 |
| | | | 463/37 |
| 2013/0225288 A1* | 8/2013 | Levin | A63F 13/92 |
| | | | 463/31 |
| 2015/0088289 A1* | 3/2015 | Robbins | G07F 17/3244 |
| | | | 700/91 |
| 2015/0335995 A1* | 11/2015 | Mclellan | A63F 13/67 |
| | | | 463/25 |
| 2016/0171835 A1* | 6/2016 | Washington | G07F 17/3223 |
| | | | 463/25 |
| 2020/0023273 A1* | 1/2020 | Tsurusaki | A63F 13/822 |
| 2020/0338451 A1* | 10/2020 | Wang | A63F 13/837 |
| 2023/0226447 A1* | 7/2023 | Ishizuka | A63F 13/69 |
| | | | 463/42 |
| 2024/0082736 A1* | 3/2024 | Sato | A63F 13/822 |

FOREIGN PATENT DOCUMENTS

| | | |
|---|---|---|
| JP | 2005-230148 | 9/2005 |
| JP | 2013-198692 | 10/2013 |
| JP | 2018-068913 | 5/2018 |

* cited by examiner

FIG. 10
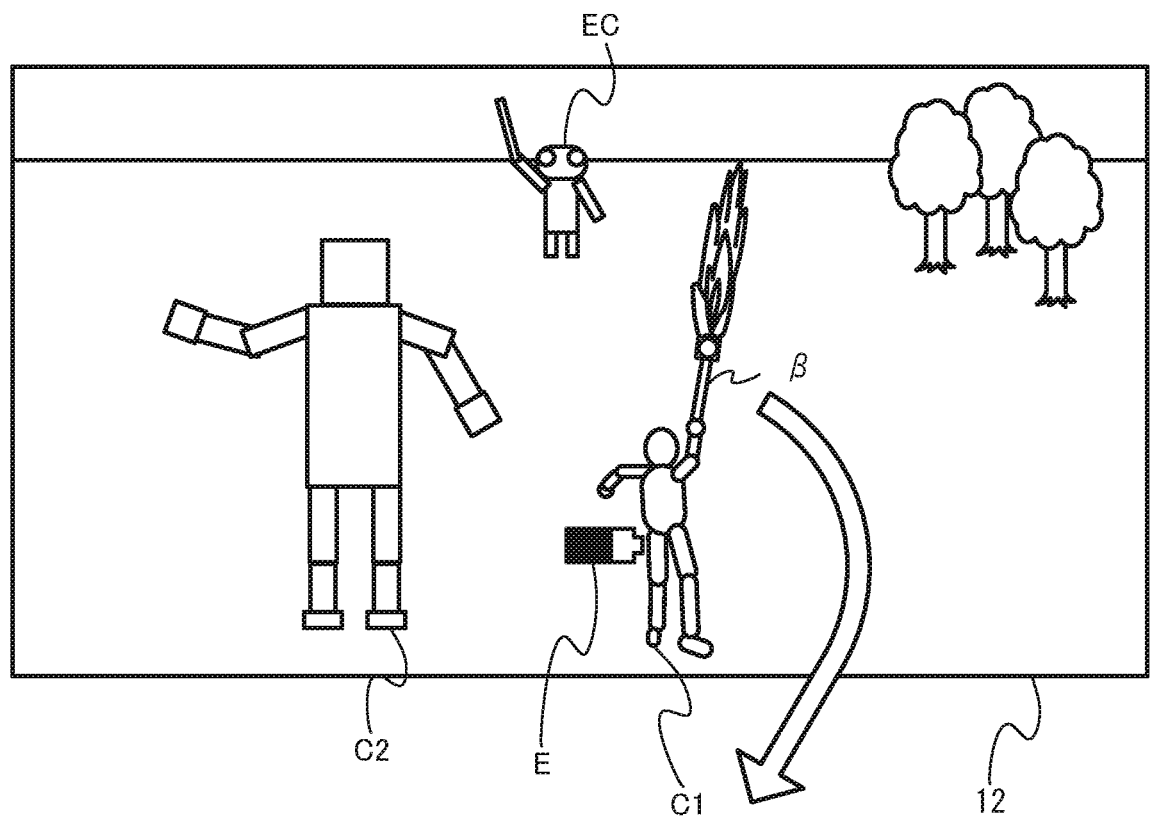
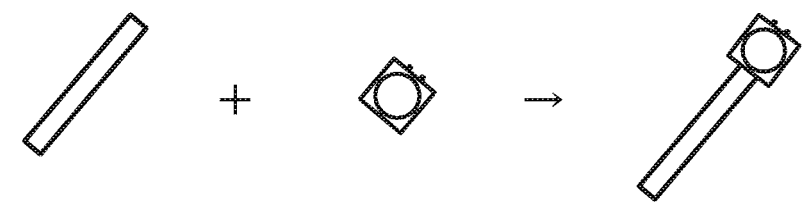
WEAPON
OBJECT A
　　　+　　ITEM OBJECT d　　→　　COMBINATION
WEAPON OBJECT β

F I G. 1 4
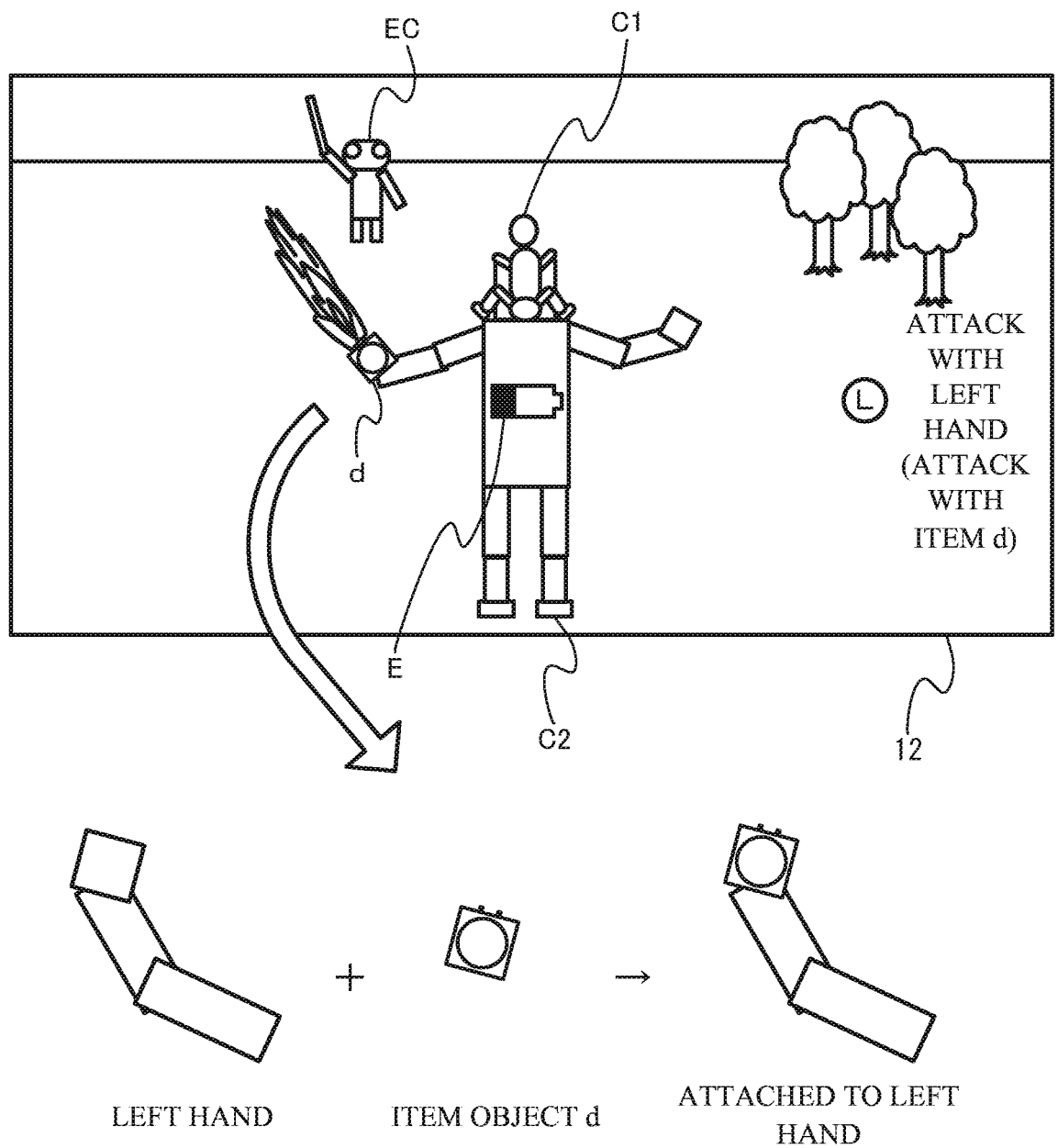

FIG. 15

| | FUNCTION TO BE IMPARTED | ITEM X1<br>IMPARTING WIND ATTACK | ITEM X2<br>IMPARTING ELECTRICAL ATTACK | ITEM X3<br>IMPARTING ICE ATTACK | ITEM X4<br>IMPARTING FIRE ATTACK | ... |
|---|---|---|---|---|---|---|
| WEAPON Y1 | STICK | COMBINATION WEAPON Z11 HITTING WITH WEAPON COVERED WITH GUST OF WIND | COMBINATION WEAPON Z12 HITTING WITH WEAPON COVERED WITH ELECTRICAL LIGHT | COMBINATION WEAPON Z13 HITTING WITH WEAPON COVERED WITH COOL AIR | COMBINATION WEAPON Z14 HITTING WITH WEAPON COVERED WITH FIRE | ... |
| WEAPON Y2 | SWORD | COMBINATION WEAPON Z21 SLASHING WITH WEAPON COVERED WITH GUST OF WIND | COMBINATION WEAPON Z22 SLASHING WITH WEAPON COVERED WITH ELECTRICAL LIGHT | COMBINATION WEAPON Z23 SLASHING WITH WEAPON COVERED WITH COOL AIR | COMBINATION WEAPON Z24 SLASHING WITH WEAPON COVERED WITH FIRE | ... |
| WEAPON Y3 | SPEAR | COMBINATION WEAPON Z31 STABBING WITH WEAPON COVERED WITH GUST OF WIND | COMBINATION WEAPON Z32 STABBING WITH WEAPON COVERED WITH ELECTRICAL LIGHT | COMBINATION WEAPON Z33 STABBING WITH WEAPON COVERED WITH COOL AIR | COMBINATION WEAPON Z34 STABBING WITH WEAPON COVERED WITH FIRE | ... |
| WEAPON Y4 | ARROW | COMBINATION WEAPON Z41 SHOOTING ARROW COVERED WITH GUST OF WIND | COMBINATION WEAPON Z42 SHOOTING ARROW COVERED WITH ELECTRICAL LIGHT | COMBINATION WEAPON Z43 SHOOTING ARROW COVERED WITH COOL AIR | COMBINATION WEAPON Z44 SHOOTING ARROW COVERED WITH FIRE | ... |
| ... | ... | ... | ... | ... | ... | ... |

F I G. 16

|  | ITEM X1 | ITEM X2 | ITEM X3 | ITEM X4 | ... |
|---|---|---|---|---|---|
| FUNCTION TO BE IMPARTED | IMPARTING WIND ATTACK | IMPARTING ELECTRICAL ATTACK | IMPARTING ICE ATTACK | IMPARTING FIRE ATTACK | ... |
| LEFT HAND | PROJECTING GUST OF WIND FROM ITEM X1 (LEFT HAND) | PROJECTING ELECTRICAL LIGHT FROM ITEM X2 (LEFT HAND) | PROJECTING COOL AIR FROM ITEM X3 (LEFT HAND) | PROJECTING FIRE FROM ITEM X4 (LEFT HAND) |  |
| RIGHT HAND | PROJECTING GUST OF WIND FROM ITEM X1 (RIGHT HAND) | PROJECTING ELECTRICAL LIGHT FROM ITEM X2 (RIGHT HAND) | PROJECTING COOL AIR FROM ITEM X3 (RIGHT HAND) | PROJECTING FIRE FROM ITEM X4 (RIGHT HAND) | ... |
| BACK | PROJECTING GUST OF WIND FROM ITEM X1 (BACK) | PROJECTING ELECTRICAL LIGHT FROM ITEM X2 (BACK) | PROJECTING COOL AIR FROM ITEM X3 (BACK) | PROJECTING FIRE FROM ITEM X4 (BACK) | ... |

STORAGE MEDIUM, GAME SYSTEM, GAME APPARATUS, AND GAME PROCESSING METHOD

CROSS REFERENCE TO RELATED APPLICATION

This application claims priority to Japanese Patent Application No. 2022-144909, filed on Sep. 12, 2022, the entire contents of which are incorporated herein by reference.

FIELD

The technology disclosed herein relates to a storage medium, game system, game apparatus, and game processing method that execute a process using a play character in a virtual space.

BACKGROUND AND SUMMARY

There has conventionally been a game apparatus that executes a game in which a player character fights with an opponent character using a weapon in a virtual space. For example, in the game apparatus, the player character is allowed to pick up a weapon from a ground in the virtual space and replace the old one with the picked-up weapon, and fight with an opponent character using the picked-up weapon.

However, in the above game apparatus, the user is allowed to operate only a single player character, and the player character is allowed to use weapons, in only a single way for each weapon.

With the above in mind, it is an object of the present example to provide a storage medium, game system, game apparatus, and game processing method that are capable of providing more various ways of using an item object in a virtual space.

To achieve the object, the present example may have features (1) to (11) below, for example.

(1) An example configuration of a non-transitory computer-readable storage medium having stored therein instructions that, when executed, cause a computer of an information processing apparatus to execute game processing comprising: controlling a first character disposed in a virtual space based on an operation input, and a second character disposed in the virtual space automatically, in a first mode; and controlling the second character based on an operation input in a second mode; wherein the controlling the first character based on an operation input in the first mode includes at least moving the first character in the virtual space, generating a combination weapon object by combining a weapon object possessed by the first character with an item object, and causing the first character to perform an attack action using the combination weapon object or the weapon object, and the controlling the second character based on an operation input in the second mode includes at least moving the second character in the virtual space, attaching the item object to a part of the second character, and causing the second character to perform an attack action using the part of the second character to which the item object is attached or a part of the second character to which the item object is not attached.

With the configuration of (1), the user is allowed to choose and operate one of the first and second characters. A plurality of ways to use an item are prepared for each of the first and second characters, resulting in more various ways to use an item object. In addition, when the second character is chosen, an attack action using an item object can be performed even if there is no weapon object.

(2) In the configuration of (1), a plurality of the item objects may be disposed in the virtual space. The game processing may further comprise, in the second mode: starting an attachment process for the item object according to a command based on an operation input; and in the attachment process, designating one of the item objects disposed in the virtual space that is to be attached, based on an operation input; designating the part to which the item object is to be attached, based on an operation input; and attaching the designated item object to the designated part.

With the configuration of (2), an item object desired by the user can be attached to a part of the second character desired by the user.

(3) In the configuration of (2), the game processing may further comprise, in the attachment process: when the item object is already attached to the part designated for the attachment, removing or deleting the item object already attached from the part; and attach, to the part, a newly designated item object to be attached.

With the configuration of (3), a new item object can be attached to a part of the second character to which an item object is already attached.

(4) In the configuration of (3), the game processing may further comprise, in the attachment process: executing a rendering process of displaying at least a portion of the second character in a translucent form.

With the configuration of (4), an attached item object can be prevented from being hidden by the second character and being substantially unseen.

(5) In the configuration of any one of (2) to (4), the game processing may further comprise, in the attachment process: when the weapon object or the combination weapon object is designated for the attachment, attaching the weapon object or the combination weapon object to the part designated for the attachment.

With the configuration of (5), the second character is allowed to perform an attack action using a weapon object or combination weapon object that is used by the first character.

(6) In the configuration of any one of (1) to (5), the game processing may further comprise, in the first mode: if, when the first character and the second character have a location relationship indicating that the first character and the second character are located close to each other, a first operation input is performed in the first mode, switching from the first mode to the second mode.

With the configuration of (6), the user is allowed to easily switch between the mode in which the first character is operated and the mode in which the second character is operated.

(7) In the configuration of (6), the controlling the second character based on an operation input in the second mode may be performed with the first character sitting on the second character.

With the configuration of (7), the current operation mode can be presented to the user in an easy-to-understand manner by displaying an image in which the first character is sitting on the second character in the second mode.

(8) In the configuration of any one of (1) to (7), the game processing may further comprise: deleting the weapon object or the combination weapon object based on a durability previously set for the weapon object, and the number of times the first character has performed an attack action using the weapon object or the combination weapon object including the weapon object.

With the configuration of (8), even in the case in which a weapon object or a combination weapon object may be deleted, depending on the durability thereof, an item object can be used in an attack action in the second mode, resulting in more situations in which an item object can be used.

(9) In the configuration of any one of (1) to (8), a plurality of the item objects may be disposed in the virtual space, and an effect may be set for each item object. The game processing may further comprise: when the first character's attack action is performed using the combination weapon object or the second character's attack action is performed using a part thereof to which the item object is attached, generating the effect set for the item object used in the action.

With the configuration of (9), an effect is set for each item object, resulting in more item object applications.

(10) In the configuration of (9), an energy parameter that is consumed when the effect is generated may be set for at least one of the item objects. The game processing may further comprise: when the effect of the at least one of the item objects is generated, consuming the energy parameter of the at least one of item objects.

With the configuration of (10), a limitation may be imposed on the use of an item object.

(11) In the configuration of (10), the energy parameter may be set in association with the first character. The game processing may further comprise: when the second character performs an action of moving or attacking, further consuming the energy parameter.

With the configuration of (11), a limitation can be imposed on the use of an item object in association with an action of the second character.

The present example may also be carried out in the form of a game system, game apparatus, and game processing method.

According to the present example, an item object that is used by each of the first and second characters can be used in more various ways.

These and other objects, features, aspects and advantages of the present exemplary embodiment will become more apparent from the following detailed description of the present exemplary embodiment when taken in conjunction with the accompanying drawings.

BRIEF DESCRIPTION OF THE DRAWINGS

FIG. 10 is a diagram illustrating a non-limiting example of a game image in which a first character C1 attacks using a combination weapon object that consumes energy in a virtual space, FIG. 14 is a diagram illustrating a non-limiting example of a game image in which a second character C2 attacks using an item object that consumes energy in a virtual space, FIG. 15 is a diagram illustrating a non-limiting example of a relationship between weapon objects, item objects, combination weapon objects generated based on these objects, and effects of attacking using the combination weapon objects, FIG. 16 is a diagram illustrating a non-limiting example of a relationship between parts of a second character C2, item objects, and effects of attacking that occur when the item objects are attached to the parts.

DETAILED DESCRIPTION OF NON-LIMITING EXAMPLE EMBODIMENTS

A game system according to the present example will now be described. An example of a game system 1 according to the present example includes a main body apparatus (information processing apparatus serving as the main body of a game apparatus in the present example) 2, a left controller 3, and a right controller 4. The left controller 3 and the right controller 4 are attachable to and detachable from the main body apparatus 2. That is, the user can attach the left controller 3 and the right controller 4 to the main body apparatus 2, and use them as a unified apparatus. The user can also use the main body apparatus 2 and the left controller 3 and the right controller 4 separately from each other (see FIG. 2). In the description that follows, a hardware configuration of the game system 1 of the present example is described, and thereafter, the control of the game system 1 of the present example is described.

Figure 1:
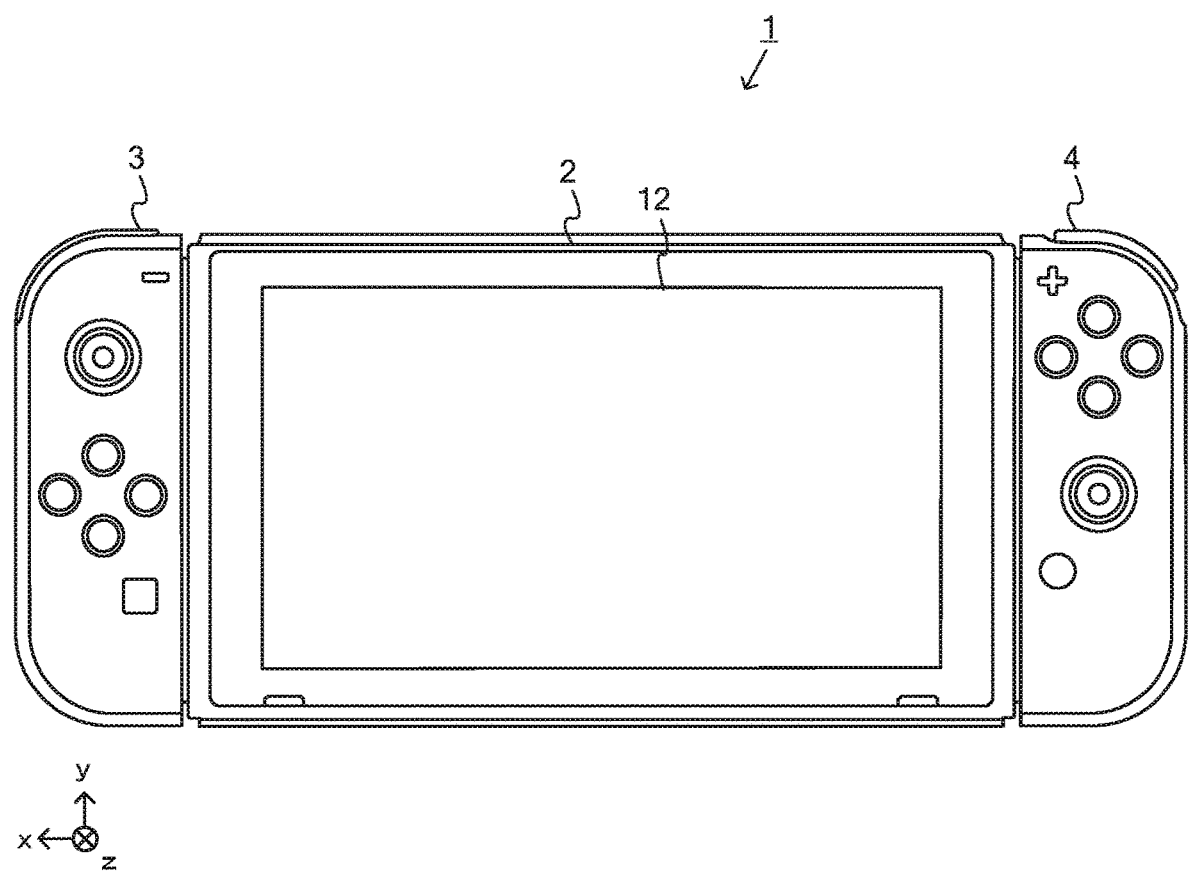
FIG. 1 is a diagram illustrating a non-limiting example of a state in which a left controller 3 and a right controller 4 are attached to a main body apparatus 2.

FIG. 1 is a diagram illustrating an example of a state in which the left controller 3 and the right controller 4 are attached to the main body apparatus 2. As illustrated in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
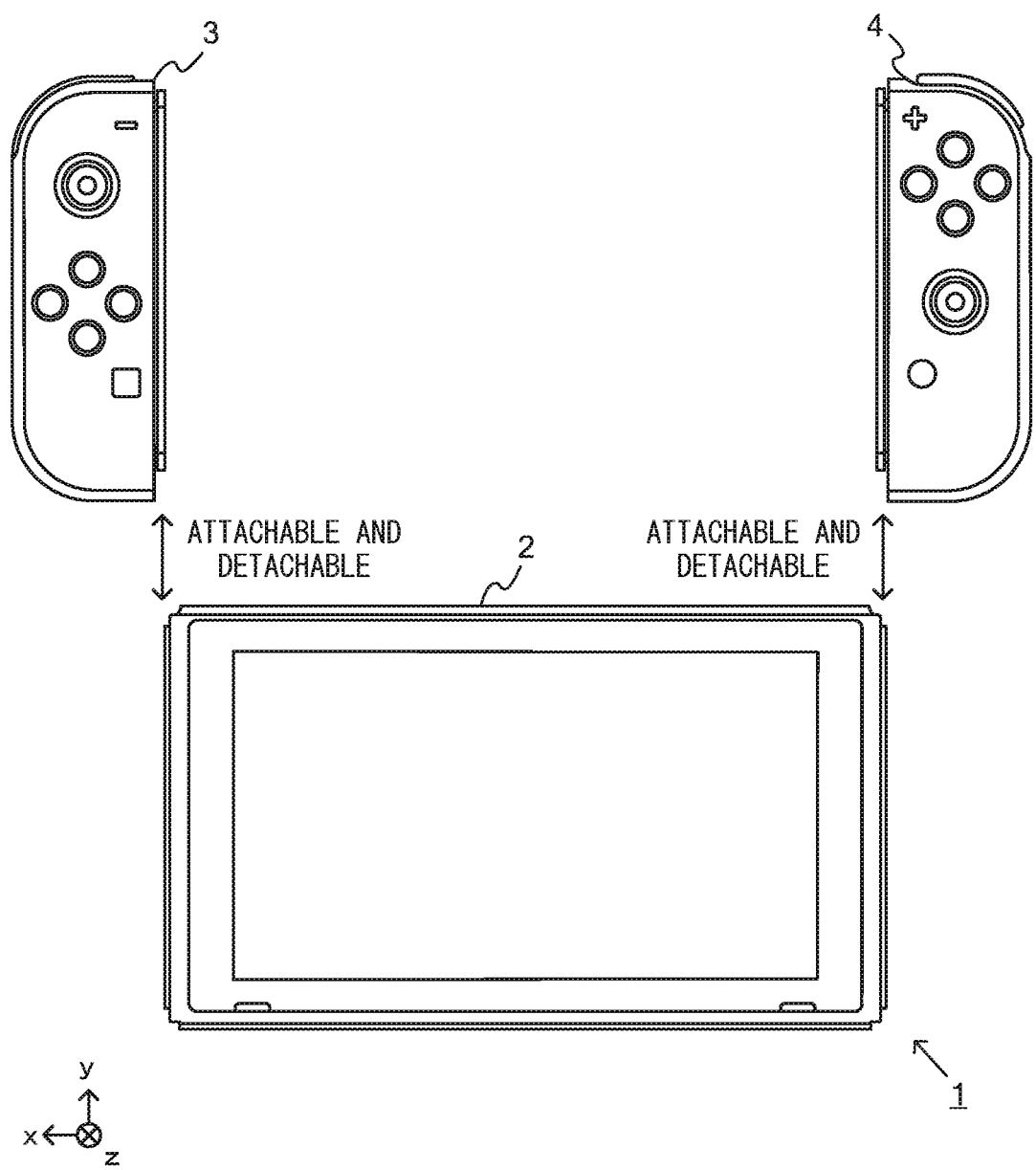
FIG. 2 is a diagram illustrating a non-limiting example of a state in which a left controller 3 and a right controller 4 are detached from a main body apparatus 2.

FIG. 2 is a diagram illustrating an example of a state in which each of the left controller 3 and the right controller 4 is detached from the main body apparatus 2. As illustrated in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
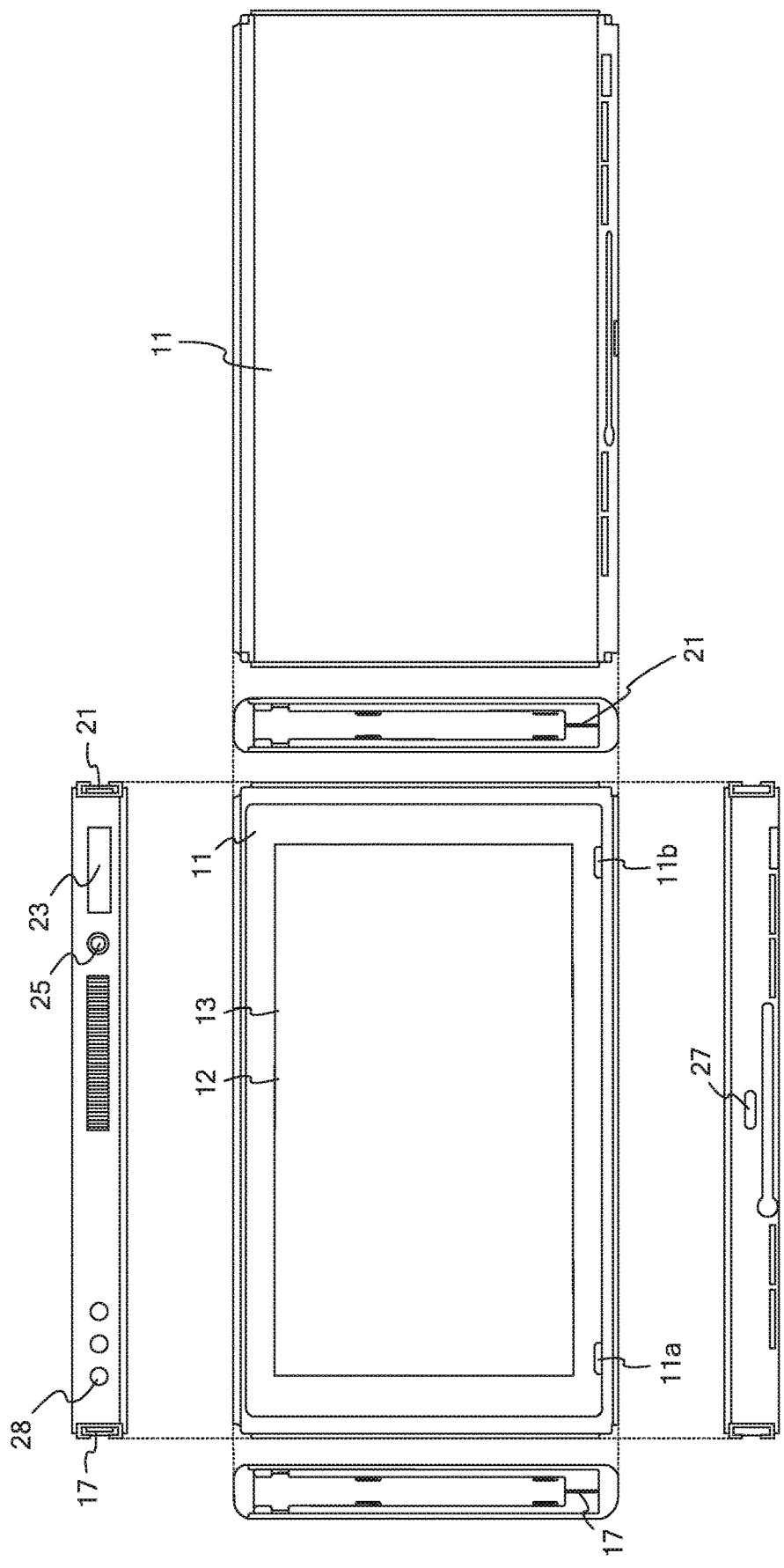
FIG. 3 illustrates six orthogonal views of a non-limiting example of a main body apparatus 2.

FIG. 3 illustrates six orthogonal views of an example of the main body apparatus 2. As illustrated in FIG. 3, the main body apparatus 2 includes an approximately plate-shaped housing 11. In the present example, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As illustrated in FIG. 3, the main body apparatus 2 includes the display 12, which is provided on the main surface of the housing 11. The display 12 displays an image generated by the main body apparatus 2. In the present example, the display 12 is a liquid crystal display device (LCD). The display 12, however, may be a display device of any suitable type.

In addition, the main body apparatus 2 includes a touch panel 13 on the screen of the display 12. In the present example, the touch panel 13 allows multi-touch input (e.g., a capacitive touch panel). It should be noted that the touch panel 13 may be of any suitable type, e.g., it allows single-touch input (e.g., a resistive touch panel).

The main body apparatus 2 includes a speaker (i.e., a speaker 88 illustrated in FIG. 6) inside the housing 11. As illustrated in FIG. 3, speaker holes 11a and 11b are formed in the main surface of the housing 11. The speaker 88 outputs sounds through the speaker holes 11a and 11b.

The main body apparatus 2 also includes a left-side terminal 17 that enables wired communication between the main body apparatus 2 and the left controller 3, and a right-side terminal 21 that enables wired communication between the main body apparatus 2 and the right controller 4.

As illustrated in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower-side terminal 27. The lower-side terminal 27 allows the main body apparatus 2 to communicate with a cradle. In the present example, the lower-side terminal 27 is a USB connector (more specifically, a female connector). When the unified apparatus or the main body apparatus 2 alone is placed on the cradle, the game system 1 can display, on a stationary monitor, an image that is generated and output by the main body apparatus 2. Also, in the present example, the cradle has the function of charging the unified apparatus or the main body apparatus 2 alone, being placed thereon. The cradle also functions as a hub device (specifically, a USB hub).

Figure 4:
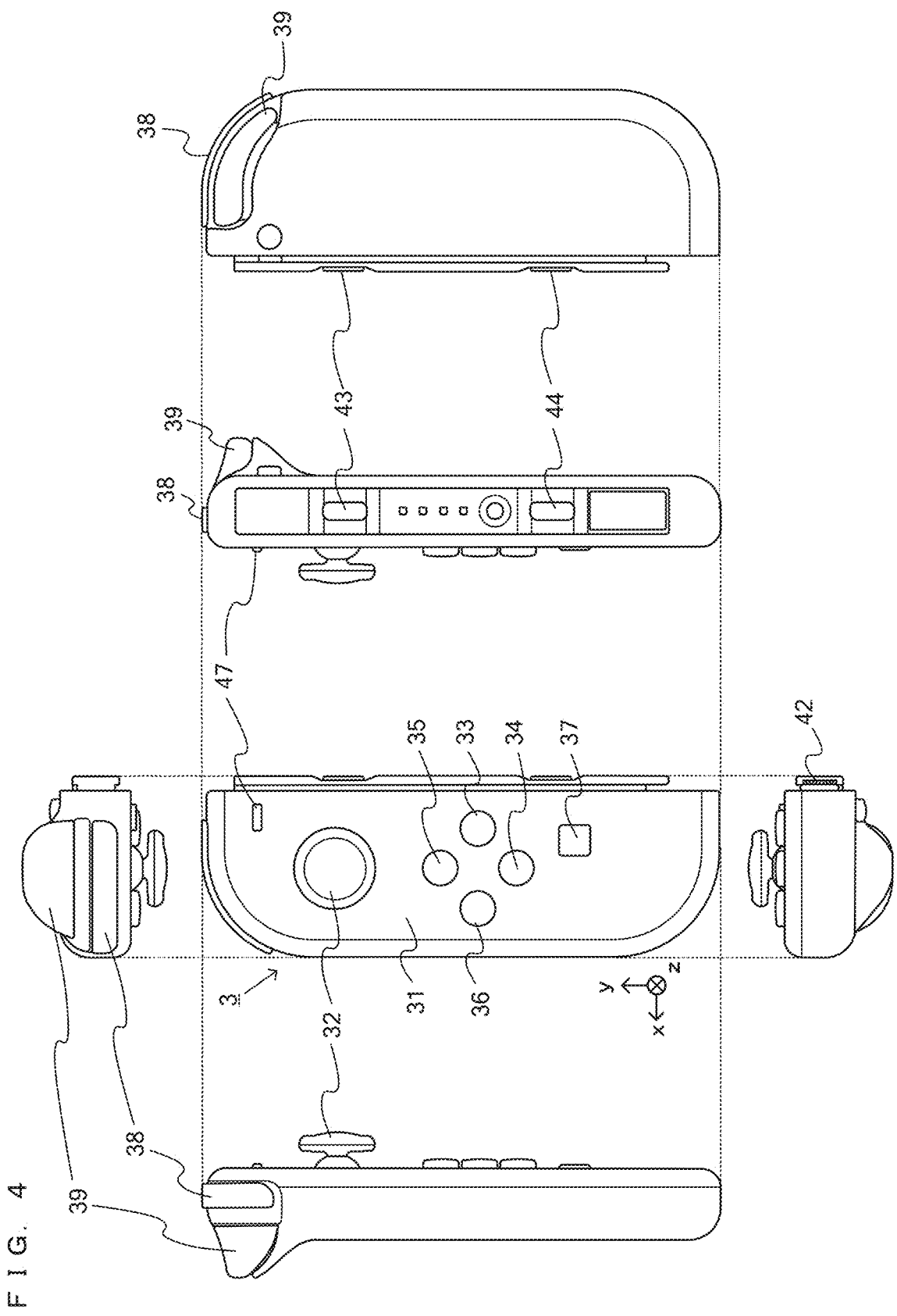
FIG. 4 illustrates six orthogonal views of a non-limiting example of a left controller 3.

FIG. 4 illustrates six orthogonal views of an example of the left controller 3. As illustrated in FIG. 4, the left controller 3 includes a housing 31. In the present example, the housing 31 has a vertically long shape, e.g., is shaped to be long in an up-down direction (i.e., a y-axis direction illustrated in FIGS. 1 and 4). In the state in which the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As illustrated in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the present example, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give commands depending on various programs (e.g., an OS program and an application program) executed by the main body apparatus 2.

The left controller 3 also includes a terminal 42 that enables wired communication between the left controller 3 and the main body apparatus 2.

Figure 5:
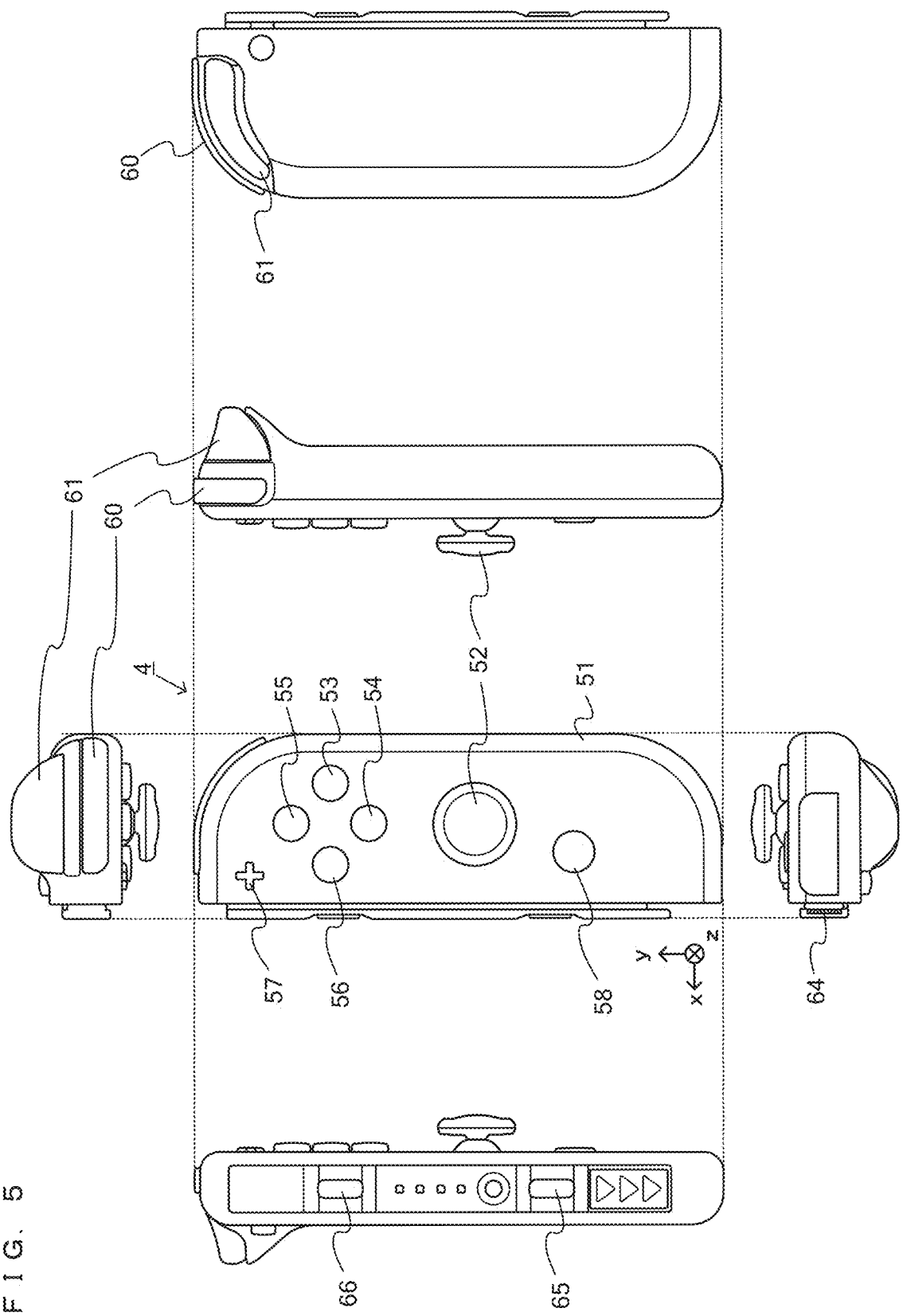
FIG. 5 illustrates six orthogonal views of a non-limiting example of a right controller 4.

FIG. 5 illustrates six orthogonal views of an example of the right controller 4. As illustrated in FIG. 5, the right controller 4 includes a housing 51. In the present example, the housing 51 has a vertically long shape, e.g., is shaped to be long in the up-down direction. In the state in which the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the present example, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for allowing the right controller 4 to perform wired communication with the main body apparatus 2.

Figure 6:
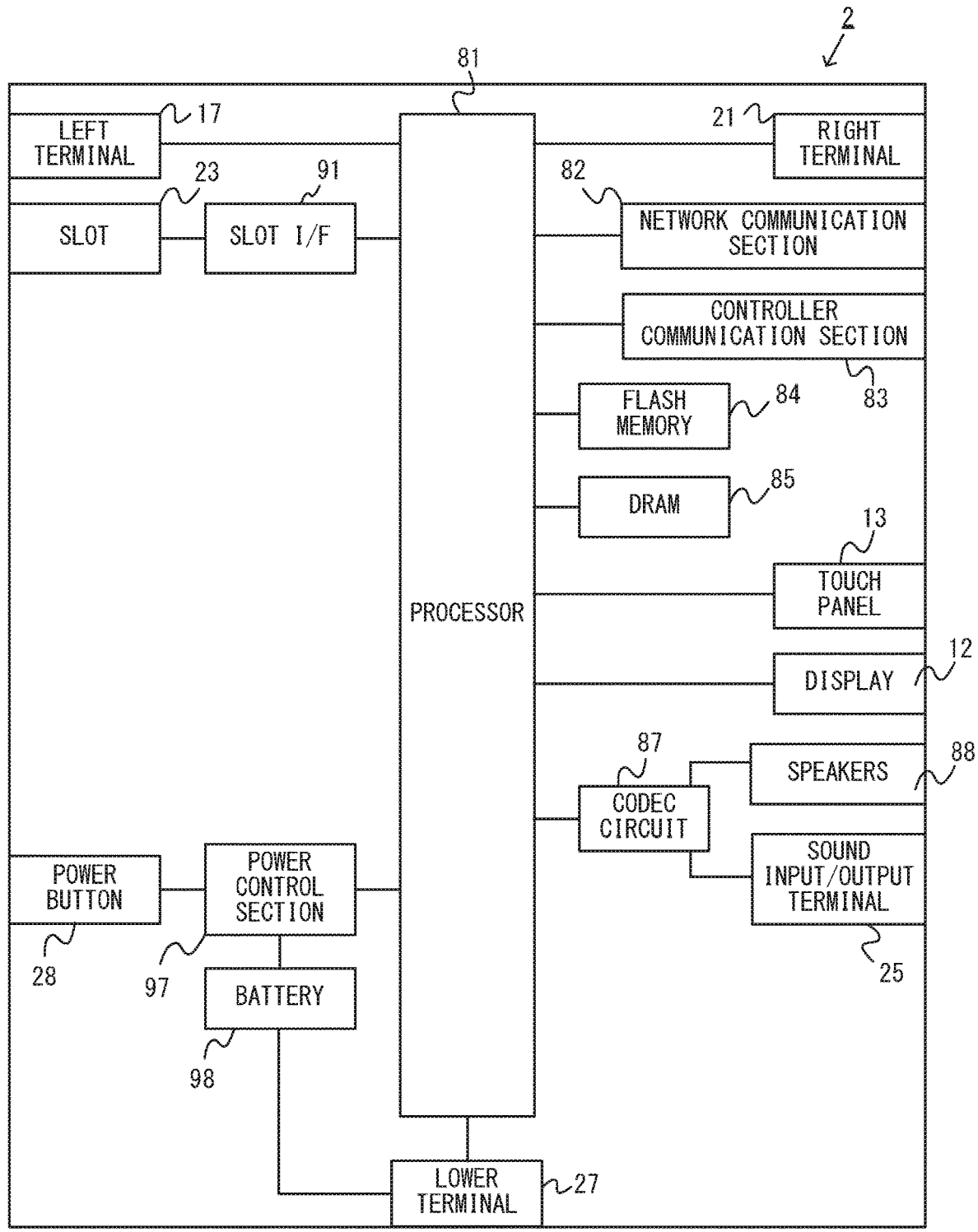
FIG. 6 is a block diagram illustrating a non-limiting example of an internal configuration of a main body apparatus 2.

FIG. 6 is a block diagram illustrating an example of an internal configuration of the main body apparatus 2. The main body apparatus 2 includes components 81 to 91, 97, and 98 illustrated in FIG. 6 in addition to the components illustrated in FIG. 3. Some of the components 81 to 91, 97, and 98 may be implemented as electronic parts on an electronic circuit board, which is contained in the housing 11.

The main body apparatus 2 includes a processor 81. The processor 81 is an information processor for executing various types of information processing to be executed by the main body apparatus 2. For example, the CPU 81 may include only a central processing unit (CPU), or may be a system-on-a-chip (SoC) having a plurality of functions such as a CPU function and a graphics processing unit (GPU) function. The processor 81 executes an information processing program (e.g., a game program) stored in a storage section (specifically, an internal storage medium such as a flash memory 84, an external storage medium that is attached to the slot 23, or the like), thereby executing the various types of information processing.

The main body apparatus 2 includes a flash memory 84 and a dynamic random access memory (DRAM) 85 as examples of internal storage media built in itself. The flash memory 84 and the DRAM 85 are connected to the CPU 81. The flash memory 84 is mainly used to store various data (or programs) to be saved in the main body apparatus 2. The DRAM 85 is used to temporarily store various data used in information processing.

The main body apparatus 2 includes a slot interface (hereinafter abbreviated to "I/F") 91. The slot I/F 91 is connected to the processor 81. The slot I/F 91 is connected to the slot 23, and reads and writes data from and to a predetermined type of storage medium (e.g., a dedicated memory card) attached to the slot 23, in accordance with commands from the processor 81.

The processor 81 reads and writes, as appropriate, data from and to the flash memory 84, the DRAM 85, and each of the above storage media, thereby executing the above information processing.

The main body apparatus 2 includes a network communication section 82. The network communication section 82 is connected to the processor 81. The network communication section 82 communicates (specifically, through wireless communication) with an external apparatus via a network. In the present example, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a particular protocol or infrared light communication). It should be noted that the wireless communication in the above second communication form achieves the function of allowing so-called "local communication", in which the main body apparatus 2 can wirelessly communicate with another main body apparatus 2 located in a closed local network area, and the plurality of main body apparatuses 2 directly communicate with each other to exchange data.

The main body apparatus 2 includes a controller communication section 83. The controller communication section 83 is connected to the processor 81. The controller communication section 83 wirelessly communicates with the left controller 3 and/or the right controller 4. The main body apparatus 2 may communicate with the left and right controllers 3 and 4 using any suitable communication method. In the present example, the controller communication section 83 performs communication with the left and right controllers 3 and 4 in accordance with the Bluetooth (registered trademark) standard.

The processor 81 is connected to the left-side terminal 17, the right-side terminal 21, and the lower-side terminal 27. When performing wired communication with the left controller 3, the processor 81 transmits data to the left controller 3 via the left-side terminal 17 and also receives operation data from the left controller 3 via the left-side terminal 17. Further, when performing wired communication with the right controller 4, the processor 81 transmits data to the right controller 4 via the right-side terminal 21 and also receives operation data from the right controller 4 via the right-side terminal 21. Further, when communicating with the cradle, the processor 81 transmits data to the cradle via the lower-side terminal 27. As described above, in the present example, the main body apparatus 2 can perform both wired communication and wireless communication with each of the left and right controllers 3 and 4. Further, when the unified apparatus obtained by attaching the left and right controllers 3 and 4 to the main body apparatus 2 or the main body apparatus 2 alone is attached to the cradle, the main body apparatus 2 can output data (e.g., image data or sound data) to a stationary monitor or the like via the cradle.

Here, the main body apparatus 2 can communicate with a plurality of left controllers 3 simultaneously (or in parallel). Further, the main body apparatus 2 can communicate with a plurality of right controllers 4 simultaneously (or in parallel). Thus, a plurality of users can simultaneously provide inputs to the main body apparatus 2, each using a set of left and right controllers 3 and 4. As an example, a first user can provide an input to the main body apparatus 2 using a first set of left and right controllers 3 and 4, and at the same time, a second user can provide an input to the main body apparatus 2 using a second set of left and right controllers 3 and 4.

Further, the display 12 is connected to the processor 81. The processor 81 displays, on the display 12, a generated image (e.g., an image generated by executing the above information processing) and/or an externally obtained image.

The main body apparatus 2 includes a codec circuit 87 and speakers (specifically, a left speaker and a right speaker) 88. The codec circuit 87 is connected to the speakers 88 and an audio input/output terminal 25 and also connected to the processor 81. The codec circuit 87 is for controlling the input and output of audio data to and from the speakers 88 and the sound input/output terminal 25.

The main body apparatus 2 includes a power control section 97 and a battery 98. The power control section 97 is connected to the battery 98 and the processor 81. Further, although not illustrated, the power control section 97 is connected to components of the main body apparatus 2 (specifically, components that receive power supplied from the battery 98, the left-side terminal 17, and the right-side terminal 21). Based on a command from the processor 81, the power control section 97 controls the supply of power from the battery 98 to each of the above components.

Further, the battery 98 is connected to the lower-side terminal 27. When an external charging device (e.g., the cradle) is connected to the lower-side terminal 27, and power is supplied to the main body apparatus 2 via the lower-side terminal 27, the battery 98 is charged with the supplied power.

Figure 7:
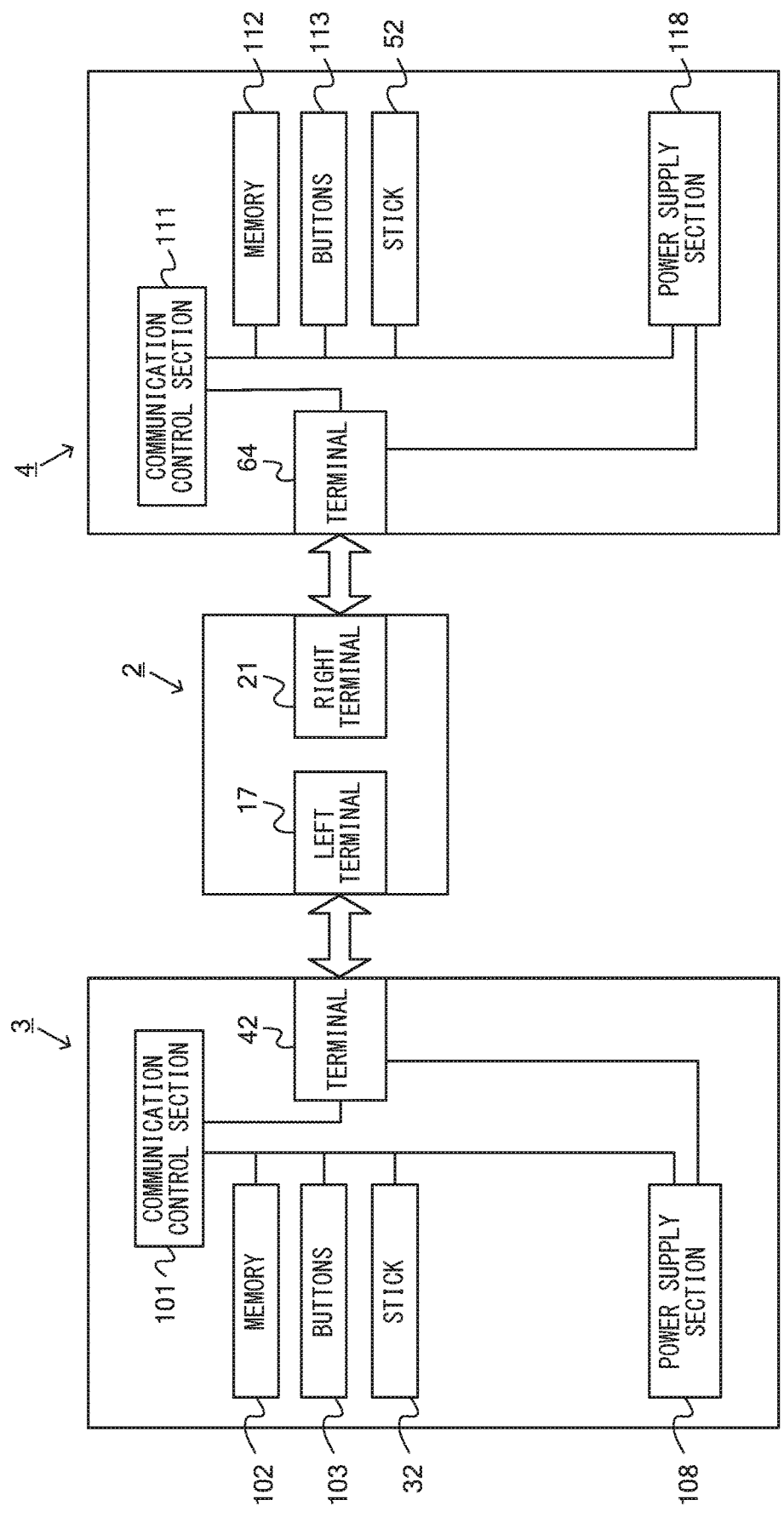
FIG. 7 is a block diagram illustrating non-limiting examples of internal configurations of a main body apparatus 2, a left controller 3, and a right controller 4.

FIG. 7 is a block diagram illustrating examples of the internal configurations of the main body apparatus 2, the left controller 3, and the right controller 4. It should be noted that the details of the internal configuration of the main body apparatus 2 are illustrated in FIG. 6 and therefore are omitted in FIG. 7.

The left controller 3 includes a communication control section 101, which communicates with the main body apparatus 2. As illustrated in FIG. 7, the communication control section 101 is connected to components including the terminal 42. In the present example, the communication control section 101 can communicate with the main body apparatus 2 through both wired communication via the terminal 42 and wireless communication without via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 obtains information regarding an input (specifically, information regarding an operation or the detection result of the sensor) from each of input sections (specifically, the buttons 103 and the analog stick 32). The communication control section 101 transmits operation data including the obtained information (or information obtained by performing predetermined processing on the obtained information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the present example, the power supply section 108 includes a battery and a power control circuit. Although not illustrated in FIG. 7, the power control circuit is connected to the battery and also connected to components of the left controller 3 (specifically, components that receive power supplied from the battery).

As illustrated in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, a communication control section 111 can communicate with the main body apparatus 2 through both wired communication via the terminal 64 and wireless communication without via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, and the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

As described above, in the game system 1 of the present example, the left controller 3 and the right controller 4 are removable from the main body apparatus 2. In addition, when the unified apparatus obtained by attaching the left controller 3 and the right controller 4 to the main body apparatus 2 or the main body apparatus 2 alone is attached to the cradle, an image (and sound) can be output on an external display device, such as a stationary monitor or the like. The game system 1 will be described below according to an embodiment in which an image is displayed on the display 12. It should be noted that in the case in which the game system 1 is used in an embodiment in which an image is displayed on the display 12, the game system 1 may be used with the left controller 3 and the right controller 4 attached to the main body apparatus 2 (e.g., the main body apparatus 2, the left controller 3, and the right controller 4 are integrated in a single housing).

A game is played using a virtual space displayed on the display 12, according to operations performed on the operation buttons and sticks of the left controller 3 and/or the right controller 4, or touch operations performed on the touch panel 13 of the main body apparatus 2, in the game system 1. In the present example, as an example, a game can be played using a player character PC that performs an action in a virtual space according to the user's operation performed using the operation buttons, the sticks, and the touch panel 13.

Figure 8:
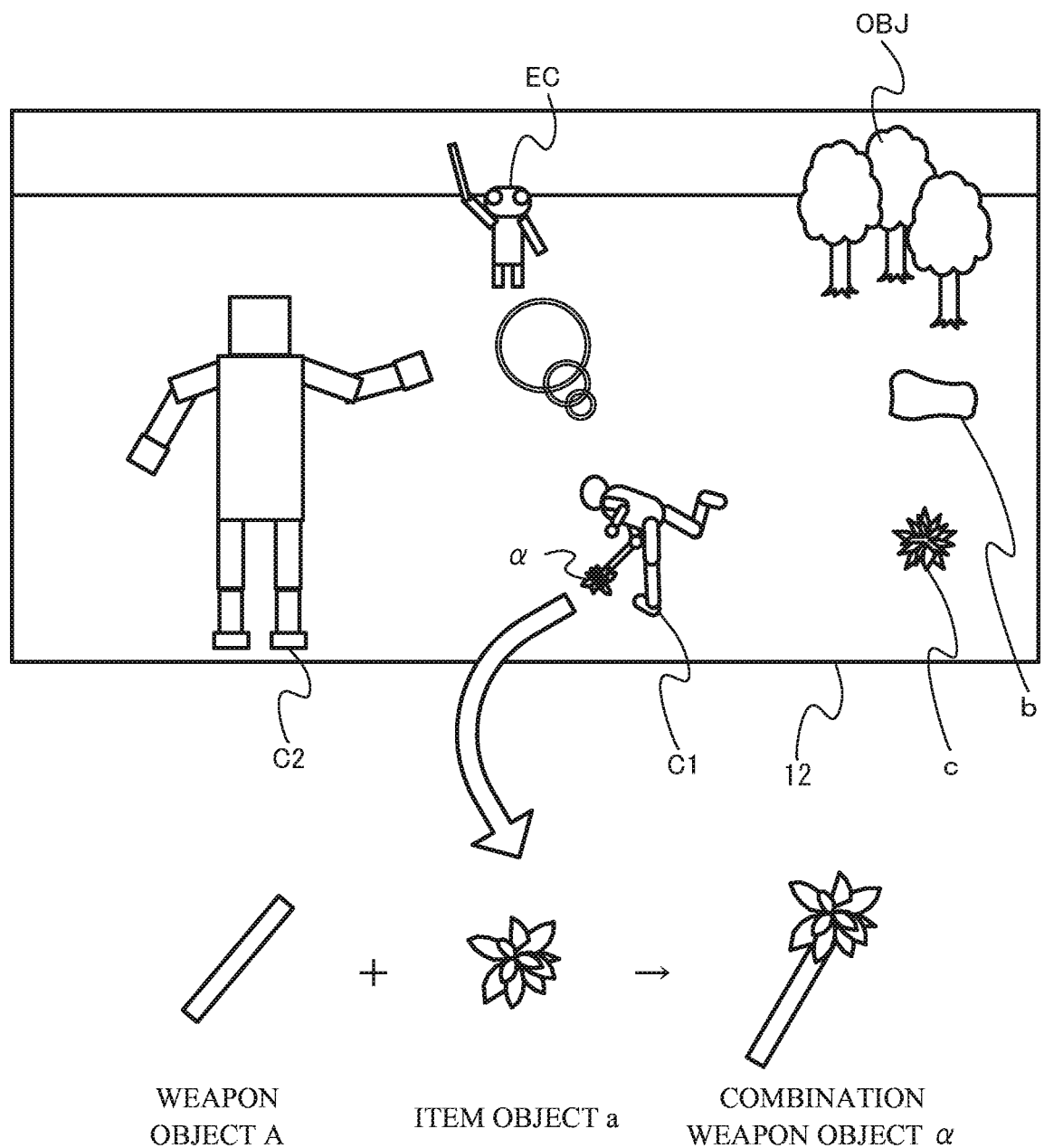
FIG. 8 is a diagram illustrating a non-limiting example of a game image in which a first character C1 attacks using a combination weapon object in a virtual space.
Figure 9:
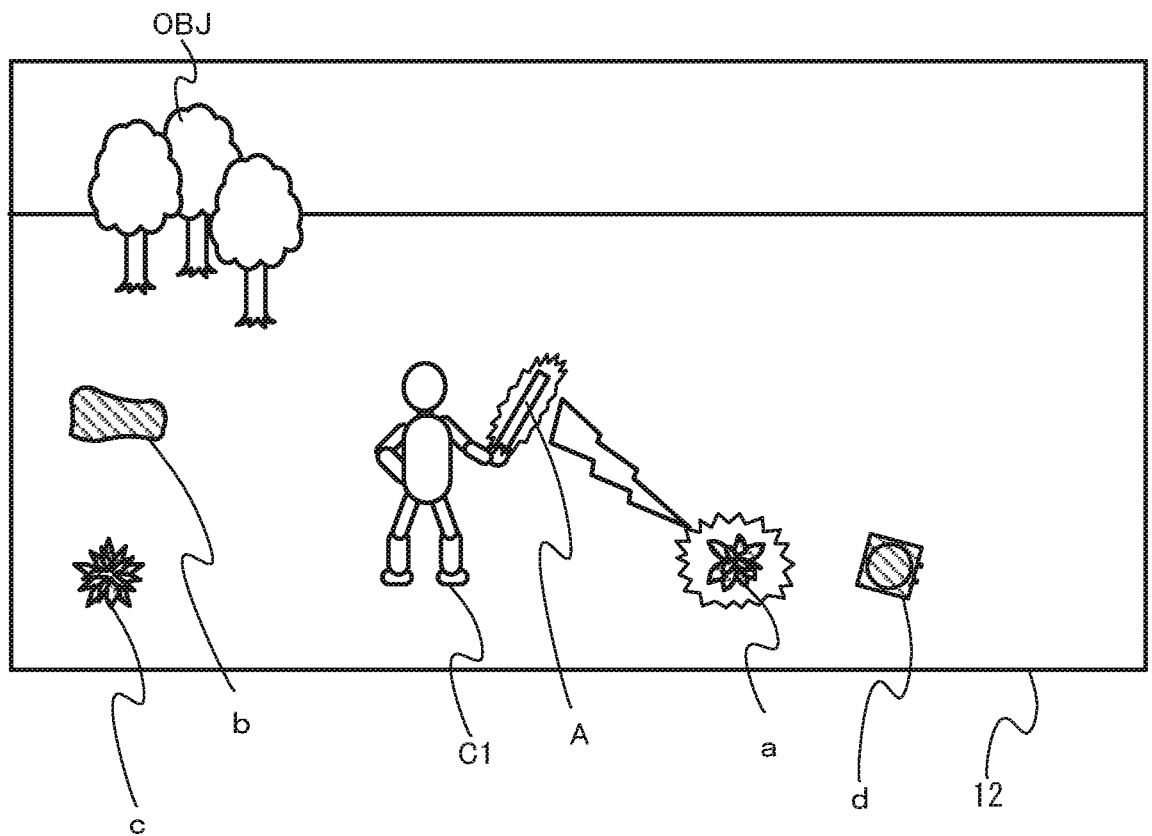
FIG. 9 is a diagram illustrating a non-limiting example of a game image in which a first character C1 synthesizes a combination weapon object in a virtual space.
Figure 11:
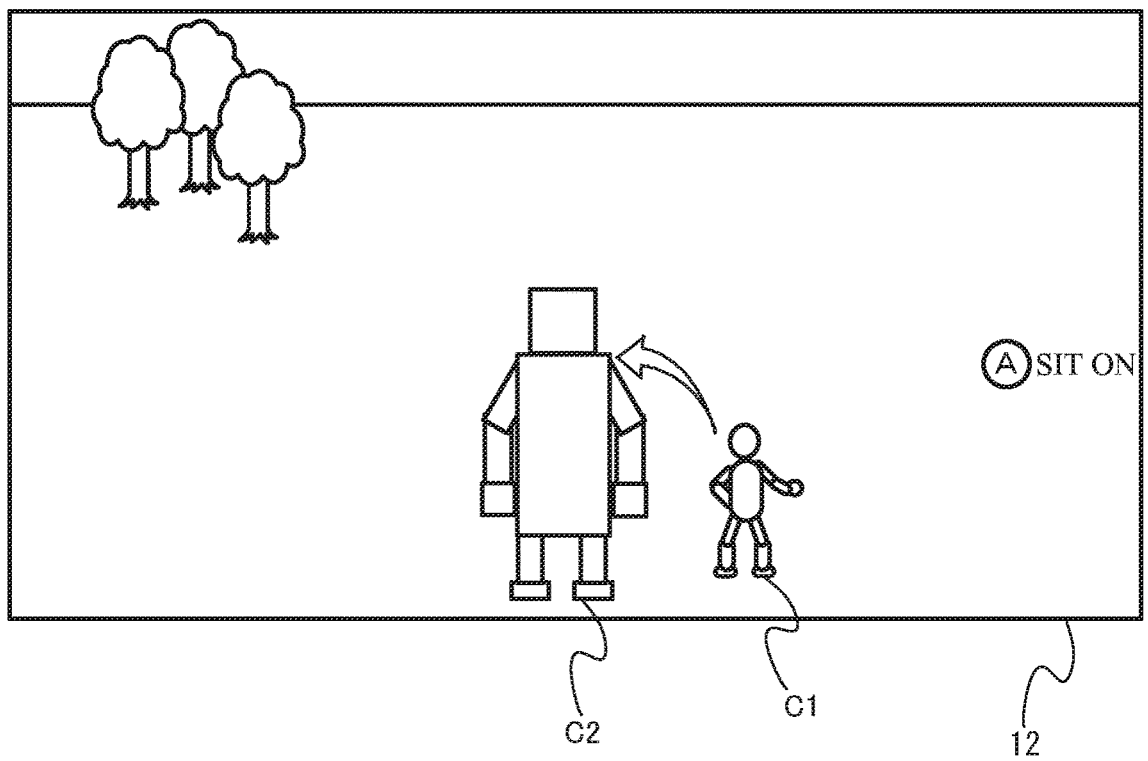
FIG. 11 is a diagram illustrating a non-limiting example of a game image in which a first character C1 sits on a second character C2 in a virtual space.
Figure 12:
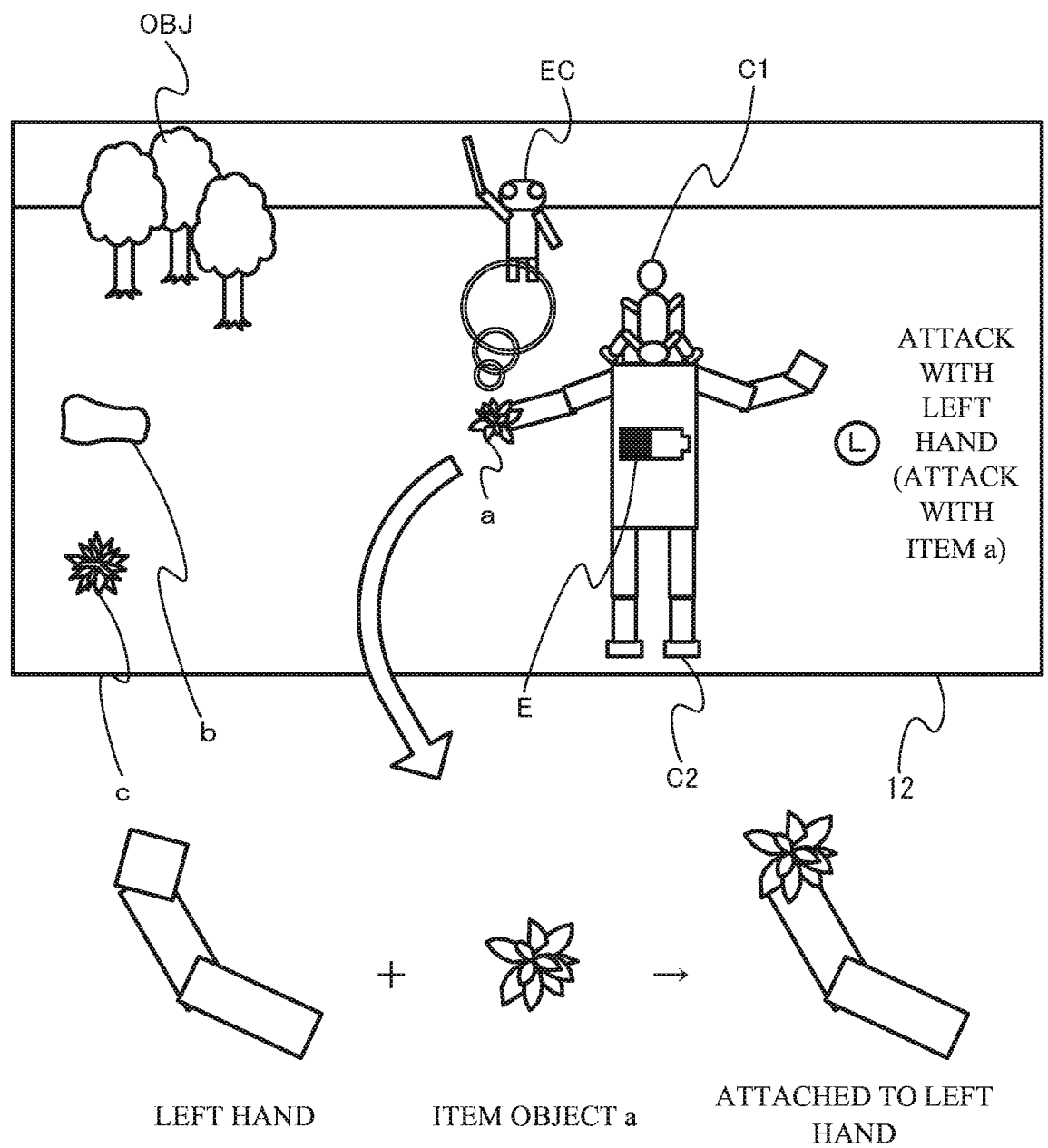
FIG. 12 is a diagram illustrating a non-limiting example of a game image in which a second character C2 attacks using an item object in a virtual space.
Figure 13:
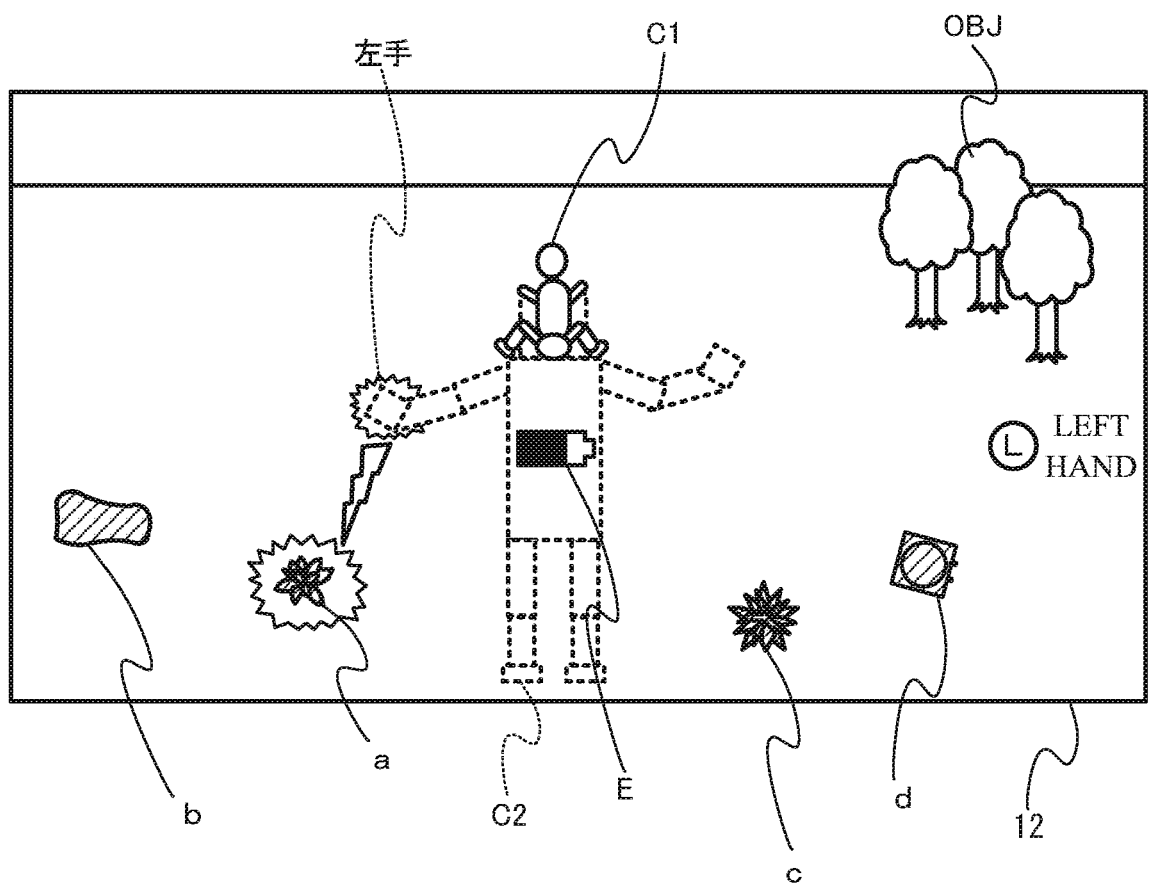
FIG. 13 is a diagram illustrating a non-limiting example of a game image in which a second character C2 wears an item object in a virtual space.

A game process that is executed in the game system 1 will be outlined with reference to FIGS. 8 to 16. It should be noted that FIG. 8 is a diagram illustrating an example of a game image in which a first character C1 attacks using a combination weapon object in a virtual space. FIG. 9 is a diagram illustrating an example of a game image in which a first character C1 synthesizes a combination weapon object in a virtual space. FIG. 10 is a diagram illustrating an example of a game image in which a first character C1 attacks using a combination weapon object that consumes energy in a virtual space. FIG. 11 is a diagram illustrating an example of a game image in which a first character C1 sits on a second character C2 in a virtual space. FIG. 12 is a diagram illustrating an example of a game image in which a second character C2 attacks using an item object in a virtual space. FIG. 13 is a diagram illustrating an example of a game image in which a second character C2 wears an item object in a virtual space. FIG. 14 is a diagram illustrating an example of a game image in which a second character C2 attacks using an item object that consumes energy in a virtual space. FIG. 15 is a diagram illustrating an example of a relationship between weapon objects, item objects, combination weapon objects generated based on these objects, and effects of attacking using the combination weapon objects. FIG. 16 is a diagram illustrating an example of a relationship between parts of a second character C2, item objects, and effects of attacking that occur when the item objects are attached to the parts.

In FIG. 8, a game image is displayed in which a first character C1, a second character C2, an opponent character EC, and various objects are disposed in a virtual space. Although in the present example, game images are displayed on the display 12 of the main body apparatus 2, game images may be displayed on another display device connected to the main body apparatus 2.

The first character C1 and the second character C2 are both allowed to serve as a player character that performs an action based on the user's movement operation input. For example, the user is allowed to switch, by performing a predetermined operation, between a first mode in which the first character C1 serves as a player character and a second mode in which the second character C2 serves as a player character.

In FIGS. 8 to 10, a situation in which a game is played in the first mode is illustrated. In the first mode, the first character C1's action is controlled based on the user's operation input, and the second character C2's action and the opponent character EC's action are automatically controlled by the processor 81.

The first character C1 is allowed to perform the action of attacking the opponent character EC according to the user's operation. As an example, the first character C1 can be controlled according to the user's operation such that the first character C1 performs an attack action using a weapon. In the present example, a weapon object, a combination weapon object, and the like are prepared as a weapon that is used by the first character C1 in an attack action. The first character C1 is allowed to be equipped with any of a weapon object and a combination weapon object, perform an attack action using a weapon object according to the user's operation, and perform an attack action using a combination weapon object according to the user's operation.

In FIG. 8, the first character C1 is carrying a combination weapon object $\alpha$ that is an example of a weapon that the first character C1 is allowed to be equipped with, and is performing the action of attacking the opponent character EC using the combination weapon object $\alpha$. For example, the first character C1, when adopting a position in which the first character C1 holds the combination weapon object $\alpha$, may perform the action of waving the held combination weapon object $\alpha$ according to the user's action command (thereby attacking the opponent character EC). In addition, the second character C2 performs the action of attaching the opponent character EC, which is fighting with the first character C1, and other actions, by the above automatic control.

For example, the combination weapon object $\alpha$ is generated by including an item object a that imparts a wind attack. Therefore, by the user causing the first character C1 to perform an attack action, the combination weapon object $\alpha$ is enabled to exhibit the function of blowing a gust of wind. When the gust of wind blown by the combination weapon object $\alpha$ hits the opponent character EC, the gust of wind can cause predetermined damage to the opponent character EC. The combination weapon object $\alpha$ is also generated by combining the item object a with a stick object (weapon object A). Therefore, by the user causing the first character C1 to perform an attack action, the combination weapon object $\alpha$ is also enabled to exhibit a basic attack function performed by the attack action of waving the stick object, which "makes an impact on another object when the stick object is brought into contact with that object". For example, when the combination weapon object $\alpha$ is waved and brought into direct contact with the opponent character EC, predetermined damage can be caused to the opponent character EC by the impact.

In the present example, a combination weapon object is generated by combining and integrating a weapon object carried by the first character C1 with a predetermined item object. For example, by the user giving an item designation command to designate an item object to be combined with a weapon object, the first character C1 is put into a state in which the first character C1 is allowed to use the item object. In this state, by the user giving an item use command to the first character C1 to combine an item object with a weapon object (in other words, a command to integrate a weapon object with an item object), a combination weapon object can be generated.

It should be noted that item objects are different from weapon objects. When the first character C1 combines an item object with a weapon object, a specific function or performance that depends on the item object is imparted to the weapon object. For example, in FIG. 8, the combination weapon object $\alpha$ used by the first character C1 is generated by combining the weapon object A with the item object $\alpha$. The weapon object A is a stick object that allows the first character C1 to perform the action of making an impact by hitting during an attack. When the weapon object A is combined with the item object a that imparts a wind attack, the action of blowing a gust of wind is allowed during the attack.

Thus, the function that is exhibited by the item object a included in the combination weapon object α is not one that is exhibited on the assumption that the basic attack function of the original weapon object is exhibited (e.g., the function of destroying another object on which an impact is made), and is one that is exhibited independently of exhibition of the basic attack function (i.e., without the assumption that the basic attack function is exhibited) (e.g., in the present example, blowing a gust of wind). It should be noted that in the present example, the function that is exhibited by the item object a included in the combination weapon object α is exhibited when an attack action is performed using the combination weapon object α, and is not exhibited when an attack action is not performed using the combination weapon object α.

Next, an example of a method of producing a combination weapon object will be described with reference to FIG. 9. As illustrated in FIG. 9, a plurality of item objects are disposed on a game field in the virtual space. In the case in which an item object(s) can be combined with a weapon object carried by the first character C1 to generate a combination weapon object, the item objects that can be combined are displayed in a display form that is different from that of objects other than said item objects. Specifically, the item objects disposed in the virtual space may be displayed in a color that is different from that of other objects, may be displayed with an effect image added thereto, or may be displayed with an effect image added thereto that is different from that added to other objects. In the example of FIG. 9, item objects a to d are displayed in a display form that is different from that of a tree object OBJ, which is not an item object (it should be noted that in FIG. 9, a difference in display form is indicated by hatching). As a result, when a game image showing a game field is displayed, the item objects that can be combined, of the objects on the game field, can be presented in an easy-to-understand manner. It should be noted that the item objects displayed in a display form different from that of other objects may be some of the item objects disposed on a game field that are located in a determination range described below.

In addition, in a state in which a combination weapon object can be generated, one(s) of the item objects is designated as an item object to be subjected to a combination process (referred to as an "item object of interest"). For example, as illustrated in FIG. 9, an effect image is added to an item object of interest. In the example of FIG. 9, the item object a is an item object of interest, and an effect image is added to the item object α.

In the present example, an item object of interest is one that is located closest to the first character C1, of item objects that are present in a determination range with reference to the location of the first character C1. It should be noted that in another example, an item object of interest may be one that is determined based on the location and orientation of the first character C1, of item objects that are present in a determination range with reference to the location of the first character C1. As an example, the determination range spreads out in front of the first character C1 (specifically, an angular range having a predetermined maximum angle on either side with reference to a front direction) and extends up to a predetermined distance from the location of the first character C1. It should be noted that the determination range may be any range that is determined based on the location of the first character C1. In another example, the determination range may be within a predetermined distance from the location of the first character C1 (independently of the orientation of the player character), or may be the range of a game field displayed on the display 12.

Thus, by adding an effect image to an item object of interest to be subjected to the combination process, the item object of interest to be subjected to the combination process can be presented in an easy-to-understand manner for the user when a game image showing a game field is displayed. It should be noted that the effect image may be any image that allows the user to distinguish the item object of interest to be subjected to the combination process from other item objects.

As illustrated in FIG. 9, an effect image indicating an item object to be subjected to the combination process has a shape suggesting that the item object a, which is an item object of interest, is linked to the weapon object A carried by the first character C1. Thus, the effect image can present the item object of interest in association with a weapon object that is to be subjected to the combination process. Thereafter, a combination weapon object is generated based on the weapon object and the item object that are associated with each other by the effect image. Therefore, the effect image can present a weapon object and an item object that are elements that can constitute a combination weapon object in an easy-to-understand manner for the user.

In a state in which the effect image of FIG. 9 is displayed, when a combination command is given from the user, the item object of interest is caused to disappear from the game field, and a combination weapon object is generated. FIG. 8 illustrates a situation in which the generated combination weapon object α is being used. In FIG. 8, the combination weapon object α has an appearance showing a combination of the weapon object A and the item object α. For example, when the combination weapon object α is generated, a scene is displayed in which the item object a approaches the weapon object A, and thereafter, the weapon object A is changed into the combination weapon object α.

As illustrated in FIG. 8, the combination weapon object α has an appearance showing a combination of the weapon object A and the item object a with the item object a attached to a tip portion of the weapon object A (in other words, the weapon object A and the item object a are integrated together with the item object a replacing a tip portion of the weapon object A). Thus, in the present example, a combination weapon object (e.g., the combination weapon object α) has an appearance including at least a portion of the appearance of a weapon object (e.g., the weapon object A) that is a constituent element of the combination weapon object and at least a portion of the appearance of an item object (e.g., the item object a) that is another constituent element of the combination weapon object. Therefore, the combination weapon object can give the user the impression that the combination weapon object is a combination of the weapon object and the item object.

It should be noted that a portion of a weapon object at which an item object is combined with the weapon object may be set, depending on the combination of the item object and the weapon object. For example, in the case in which an item object is combined with a bow-and-arrow object that is a long-range weapon object, the resultant combination weapon object may have an appearance in which the item object is combined with the bow-and-arrow object at an arrowhead portion, nock portion, or shaft portion of an arrow object included in the bow-and-arrow object. Alternatively, in the case in which an item object is combined with a shield object that is a defensive weapon object, the resultant combination weapon object may have an appearance in which the item object is combined with the shield object at a center portion or outer frame portion of the shield object.

It should be noted that in the example of FIG. 8, the combination weapon object has an appearance in which a portion of the original appearance of the weapon object A, which is a constituent element of the combination weapon object, is replaced with all of the appearance of the item object a, which is another constituent element of the combination weapon object. It should be noted that a combination weapon object may have an appearance in which a portion of the original appearance of a weapon object that is a constituent element of the combination weapon object is replaced with a portion of the appearance of the item object that is another constituent element of the combination weapon object. Alternatively, a combination weapon object may have an appearance in which all of the original appearance of a weapon object that is a constituent element of the combination weapon object is combined with all or a portion of the appearance of an item object that is another constituent element of the combination weapon object.

In addition, item objects may be previously disposed on a game field at the beginning of a game, or may be disposed by being dropped by the opponent character EC, or in response to the defeat of the opponent character EC, or may be obtained from an object other than item objects (e.g., a firewood object that is disposed on a game field by the first character C1 attacking a tree object OBJ). In addition, objects that are not an item object may be disposed on a game field. In addition, objects (including item objects) that appear in a game may include objects that can be stored by the first character C1, and objects that cannot be stored by the first character C1. A state in which the first character C1 stores an object refers to a state in which the first character C1 is allowed to carry the object without being equipped with or holding the object, or the like. No stored objects are displayed on a game field. When the first character C1 retrieves a stored object, the first character C1 can dispose the object on a game field or use the object (including being equipped with the object, and holding the object). In addition, a weapon object may serve as an item object. In that case, weapon objects may be combined together to generate a combination weapon object.

As described above, a combination weapon object has a function different from that of a weapon object that is a constituent element of the combination weapon object. Here, the term "a combination weapon object has a function different from that of a weapon object" means that (a) an ability value set for the combination weapon object is different from an ability value set for the weapon object, and (b) the combination weapon object has a function that is not possessed by the weapon object (or the weapon object has a function that is not possessed by the combination weapon object). For example, examples of the function include the function of giving thrust to a combination weapon object by combining an item object that obtains thrust, the function of extending the attack range of a combination weapon object by combining an item object that extends, and the function of projecting a gust of wind or fire by combining an item object that blows a gust of wind or projects fire. As an example, the combination weapon object α of FIG. 8 is generated by combining a stick object that is a weapon object capable of performing a hitting attack with a leaf object that is an item object which imparts a wind attack, and therefore, has the function of blowing a gust of wind during an attack. It should be noted that the item object which imparts a wind attack (the item object a illustrated in FIG. 8) can blow a gust of wind during an attack without consuming energy as described below (i.e., not an energy consuming object described below), and therefore, when the first character C1 performs an attack using the combination weapon object α, the first character C1 can always perform an attack that blows a gust of wind.

It should be noted that the first character C1 may be able to be equipped with a plurality of weapon objects. Here, in the present example, the first character C1 may be able to be simultaneously equipped with the above combination weapon object, and in addition, short-range weapon objects such as a sword object and a spear object, long-range weapon objects such as a bow-and-arrow object, defensive weapon objects such as a shield object, and the like. In that case, the first character C1 can perform an attack action while holding one of the weapon objects with which the first character C1 is equipped. Specifically, the first character C1 is caused to adopt a position in which the first character C1 holds a chosen weapon object according to the user's action command to choose and hold the weapon object, and is caused to perform an attack action using the weapon object according to the user's action command. It should be noted that in another example, the number of weapon objects with which the first character C1 can be simultaneously equipped may be one.

As another example of the combination weapon object that is used by the first character C1, a combination weapon object β that imparts the function of projecting fire to a weapon object that is a constituent element thereof, and consumes energy due to the fire projection, will be described with reference to FIG. 10.

An item object d illustrated in FIG. 10 has the function of projecting fire, and can take a function enabled state in which the item object d can project fire and a function disabled state in which the item object d cannot project fire, depending on the state of remaining energy. For example, in the present example, energy is set for enabling the item object d included in the combination weapon object β to project fire. For example, the energy is consumed in a predetermined amount depending on a period of time during which the action of projecting fire is performed, and recovers by a predetermined amount when that action is not performed. When the energy remains, the item object d is in the function enabled state. When the energy is recovering from zero to the maximum (referred to as a "charge state"), the item object d is in the function disabled state. An item object that consumes energy due to the use of the function, and can take the function enabled state or the function disabled state, depending on the state of remaining energy, is herein referred to as an energy consuming object. It should be noted that the item object d is an energy consuming object that can project fire from the combination weapon object β to perform an attack under a predetermined condition (e.g., an attack is performed by the first character C1 or the like) when the item object d is in the function enabled state, and consumes energy depending on the fire projection. On the other hand, the item object a does not consume energy even when the item object a blows a gust of wind from the combination weapon object α to perform an attack, and therefore, is not an energy consuming object.

As illustrated in FIG. 10, the first character C1 has the combination weapon object β that is generated by combining the item object d with the weapon object A. In the example of FIG. 10, the first character C1 attacks the opponent character EC using the combination weapon object β.

The combination weapon object β has the function of projecting fire as with the item object d, which is a constituent element thereof, and can take a function enabled state in which the combination weapon object β can project fire and a function disabled state in which the combination weapon object β cannot project fire. For example, as illustrated in FIG. 10, when the first character C1 performs an attack action with the combination weapon object β in the function enabled state, the combination weapon object β projects fire.

As the combination weapon object β is generated by combining the item object d that imparts a fire attack, the combination weapon object β can be caused to exhibit the function of projecting fire by the user causing the first character C1 to perform an attack action with the combination weapon object β in the function enabled state. When fire projected from the combination weapon object β hits the opponent character EC, the fire can cause predetermined damage to the opponent character EC. In addition, the combination weapon object β is generated by combining a stick object (the weapon object A) with the item object d, the combination weapon object β also exhibits a basic attack function performed by the attack action of waving the stick object which "makes an impact on another object contacted", by the user causing the first character C1 to perform an attack action. For example, when the combination weapon object β is waved to be brought into direct contact with the opponent character EC, the impact can cause predetermined damage to the opponent character EC even when the combination weapon object β is in the function disabled state. Thus, the function (e.g., fire projection in the present example) that is exhibited by the item object d included in the combination weapon object β in the function enabled state is not exhibited on the assumption that the basic attack function of the weapon object that is a constituent element of the combination weapon object β is exhibited, and is exhibited independently of the exhibition of the basic attack function. It should be noted that in the present example, the function that is exhibited by the item object d included in the combination weapon object β is also exhibited when an attack action is performed using the combination weapon object β, and is not exhibited if, even when the combination weapon object β is in the function enabled state, an attack action is not performed. In addition, even if, when the combination weapon object β is in the function disabled state, the first character C1 performs an attack action, the combination weapon object β does not project fire, but can exhibit the attack function of the stick object, which is a weapon object as a constituent element of the combination weapon object β.

As illustrated in FIG. 10, in the present example, when a combination weapon object is an energy consuming object, an energy gauge E for the combination weapon object is displayed. The energy gauge E shows a gauge amount that indicates the remaining amount of the energy which is consumed, depending on the exhibition of a function of an item object included in a combination weapon object.

For example, the energy of the combination weapon object β is consumed in a predetermined amount depending on a period of time during which the action of projecting fire is performed. Therefore, the displayed remaining amount shown by the energy gauge E is reduced, depending on the consumption of the energy. In addition, the energy recovers by a predetermined amount depending on a period of time during which the action of projecting fire is not performed. Therefore, the displayed remaining amount shown by the energy gauge E is increased, depending on the recovery of the energy. Furthermore, when the remaining amount of the energy is zero, the charge state will start and continue until the energy recovers to the maximum, during which the combination weapon object β is in the function disabled state.

In the charge state, the energy gauge E shows a situation in which the gauge amount recovers with time. Furthermore, the charge state may be displayed in a form (e.g., flickering, changing colors, or changing sizes) different from in the normal recovery state. In the charge state, when the energy recovers to the maximum gauge amount of the energy gauge E, the energy gauge E returns to the normal display form, the charge state is removed, and the combination weapon object is switched to the function enabled state. It should be noted that the amount of recovery of the energy per unit time in the charge state and the amount of recovery of the energy per unit time in states other than the charge state may be the same or different.

Thus, the displaying of the energy gauge E allows the user to more easily recognize changes or the state (the function enabled state or the function disabled state) of the energy of a combination weapon object.

In the present example, for a weapon object, a weapon durability value indicating the durability of the weapon object may be set. For example, in the game system 1, the weapon durability value of a weapon object is reduced, depending on the use of the weapon object. When the weapon durability value is zero, the weapon object will break (i.e., disappear). As an example, each time the first character C1 performs an action using a weapon object once, the weapon durability value of the weapon object is reduced by a predetermined value. It should be noted that the weapon durability value of a weapon object may be reduced, depending on the number of times the first character C1 has performed an action using the weapon object, or a period of time during which the first character C1 has performed an action using the weapon object. In addition, for some weapon objects appearing in a game, a weapon durability value may not be set. In that case, a weapon object for which a weapon durability value is not set may not be able to be included in a combination weapon object.

When a combination weapon object is generated based on a weapon object for which a weapon durability value is set, a weapon durability value is also set for the combination weapon object. The initial value (i.e., a value immediately after synthesis) of the weapon durability value of a combination weapon object may be set to any value. For example, the initial value may be set based on the weapon durability value (e.g., a value immediately before synthesis) of a weapon object as a constituent element, or may be a value previously determined in a game. For example, a weapon durability value set for a combination weapon object may be reduced, depending on the use of the combination weapon object. As an example, each time the first character C1 performs an action using a combination weapon object once, the weapon durability value of the combination weapon object is reduced by a predetermined value. When the weapon durability value of a combination weapon object is zero, the combination weapon object will disappear as with a weapon object. It should be noted that the weapon durability value of a combination weapon object may also be reduced, depending on the number of times the first character C1 has performed an action using the combination weapon object, or a period of time during which the first character C1 has performed an action using the combination weapon object. In addition, when a combination weapon object disappears, the item object as a constituent element thereof may also disappear, or only said item object may be returned into the virtual space.

In addition, for an item object, an item durability value indicating the durability of the item object may be set. When a combination weapon object is generated based on an item object for which an item durability value is set, an item durability value is also set for the combination weapon object. In that case, for a combination weapon object, two durability values, i.e., a weapon durability value and an item durability value, may be set. The initial value (i.e., a value immediately after synthesis) of the item durability value of a combination weapon object may be set to any value. For example, the initial value may be set based on the item durability value (e.g., a value immediately before synthesis) of an item object that is a constituent element of the combination weapon object, or may be a value previously determined in a game. An item durability value set for a combination weapon object is reduced, depending on the use (i.e., the number of times of use or the use period of time) of the combination weapon object as with the weapon durability value. It should be noted that the weapon durability value and item durability value of a combination weapon object may be reduced by the same or different methods.

Here, when the weapon durability value of a combination weapon object is not zero and the item durability value of the combination weapon object is zero, the combination weapon object will disappear and the weapon object that is a constituent element thereof will be returned. In that case, the item object that is a constituent element of the combination weapon object will not be returned, and therefore, the combination weapon object will not be separated into the weapon object and the item object that are a constituent element of the combination weapon object. It should be noted that the initial value (i.e., a value immediately after returning) of the weapon durability value of the returned weapon object may be set to any value. For example, the initial value may be set based on the weapon durability value (e.g., a value immediately before returning) of the combination weapon object, or may be a value previously determined in a game.

It should be noted that when the item durability value of a combination weapon object is not zero and the weapon durability value of the combination weapon object is zero, the combination weapon object may disappear and an item object that is a constituent element of the combination weapon object may also disappear. As another example, when the item durability value of a combination weapon object is not zero and the weapon durability value of the combination weapon object is zero, the combination weapon object may disappear and an item object that is a constituent element of the combination weapon object may be returned.

Thus, an item durability value is set for a combination weapon object based on an item object for which a durability value is set. Therefore, properties (i.e., properties of having a durability value) of an item object can be inherited to a combination weapon object. In addition, when the item durability value of a combination weapon object is zero, the weapon object with which the first character C1 is equipped will have an appearance showing that a portion of the combination weapon object having an appearance of an item object has disappeared from the combination weapon object, in a game scene. Therefore, a weapon object with which the first character C1 is equipped can be changed in a way that is easily recognized by the user. It should be noted that a weapon object that is returned from a combination weapon object may be returned in a state in which the first character C1 is wearing the weapon object, or in a state in which the weapon object is disposed on a game field (e.g., placed at or near a foot of the first character C1). In addition, the weapon durability value of a weapon object returned from a combination weapon object may be set to any value, and may be set to the weapon durability value of the combination weapon object immediately before disappearing or immediately before synthesis.

In addition, as an object with which an item object is to be combined, a combination weapon object that already includes another item object may be able to be designated. In that case, the item object already included in the designated combination weapon object may be removed or disappear, and a newly designated item object may be newly combined with the weapon object from which the function of the previous item object has been removed. As an example, when an item use command to combine a combination weapon object with a newly designated item object is given, a process of removing or deleting the item object already combined and a process of combining the newly designated item object may be performed in combination. As another example, after the user gives a command to remove the item object already combined, so that the process of removing or deleting the item object is performed earlier, an item use command may be newly given such that a newly designated item object is attached to a weapon object from which the previous item object has been removed.

In the present example, when the first character C1 and the second character C2 are under predetermined conditions in the first mode, the first mode may be switched to the second mode according to the user's predetermined operation input. For example, as illustrated in FIG. 11, when the first character C1 and the second character C2 approach each other in the first mode, so that the first character C1 and the second character C2 are located within a predetermined range, displaying is performed so as to prompt the user to determine whether or not to put the first character C1 on the second character C2. When the user performs an operation of determining to put the first character C1 on the second character C2, a scene is displayed in which the first mode is switched to the second mode by putting the first character C1 on the second character C2. In the second mode, a game image is displayed in which the first character C1 operates the second character C2 while sitting on the second character C2. The second character C2 serves as a player character that performs an action based on the user's operation input.

In addition, when the second character C2, on which the first character C1 is sitting, is under predetermined conditions in the second mode, the second mode may be switched to the first mode according to the user's predetermined operation input. For example, when the second character C2, on which the first character C1 is sitting, is in a predetermined state in the second mode, displaying is performed so as to prompt the user to determine whether or not to put down the first character C1 from the second character C2. When the user performs an operation of determining to put down the first character C1 from the second character C2, a scene is displayed in which the first character C1 is put down from the second character C2, so that the second mode is switched to the first mode. Thus, in the present example, a plurality of player characters can be switched and operated by changing the modes, resulting in a game play having numerous variations.

FIGS. 12 to 14 illustrate a situation in which a game is played in the second mode. In the second mode, a game image is displayed in which the first character C1 is operating the second character C2 while sitting on the second character C2. In the second mode, the action of the second character C2, on which the first character C1 is sitting, is controlled based on the user's operation input, and the action of the opponent character EC is automatically controlled by the processor 81.

In the second mode, a scene is displayed in which the second character C2 behaves as a robot that is operated by the first character C1 in a game. The second character C2 can perform the action of attacking the opponent character EC according to the user's operation with the first character C1 sitting on the second character C2. As an example, when a part (e.g., the left hand, the right hand, the left leg, the right leg, or the body) of the second character C2 that is to be used in an attack is chosen by the user's operation, an attack action using the part of the second character C2 can be controlled, or the second character C2's attack action using an item attached to the part can be controlled. In the present example, the above item objects are used as an item that the second character C2 uses in an attack action. The second character C2 is allowed to wear an item object on a part of itself, and when the part is chosen according to the user's operation, the second character C2 is allowed to perform an attack action using the item object. Here, item objects that are used by the second character C2 are the same as those that can be used to synthesize a combination weapon object, and can be used in an attack action by the respective methods of the first character C1 and the second character C2.

In FIG. 12, the second character C2 is wearing, on the left hand, an item object a that is an example of a wearable item, and is performing the action of attacking the opponent character EC using the left hand, to which the item object a is attached. For example, the second character C2 performs the action of waving the item object a attached to the left hand (thereby attacking the opponent character EC) according to the user's action command to attack using the left hand, with the item object a attached to the left hand.

As described above, the item object a has the function of imparting a wind attack, and therefore, by the user causing the second character C2 to perform an attack action using a part to which the item object a is attached, the item object a can be caused to exhibit the function of blowing a gust of wind. When the gust of wind blown from the item object a hits the opponent character EC, the gust of wind can cause predetermined damage to the opponent character EC. In addition, as the item object a is attached to the left hand of the second character C2, a basic attack function of an attack action using the left hand, i.e., "an impact is made to another object punched", is exhibited by the user causing the second character C2 to perform an attack action using the left hand. For example, when the second character C2 performs the attack action of punching the opponent character EC with the left hand, the left hand the second character C2 can make an impact that causes predetermined damage to the opponent character EC.

The second character C2 can also attack the opponent character EC using a part thereof to which an item object is not attached. For example, a part of the second character C2 that is to be used for an attack is chosen and designated from a plurality of parts thereof based on the user's operation input. When an item object is not attached to the part designated by the user's operation, the second character C2 performs an attack action using that part itself. In addition, when an item object is attached to the designated part, the second character C2 performs an attack action using the part itself while the function of the item object is exhibited.

In the present example, when an item object is attached to a part of the second character C2, the second character C2 is allowed to use the item object in an attack action. For example, by the user giving an item designation command to designate an item object that is to be attached to a part of the second character C2, the second character C2 is put into a state in which the second character C2 is allowed to use the item object. In that state, the user can designate a part to which an item object is to be attached (attachment target part), and give an item use command to designate an item object that is to be attached, thereby attaching the item object to the second character C2.

It should be noted that when an item object is attached to a part of the second character C2, the item object imparts a specific function or effect associated with the item object to the part. For example, in FIG. 12, the item object a that the second character C2 is wearing is attached to the left hand of the second character C2. The left hand of the second character C2 is a part that can be used by the second character C2 to perform the action of making an impact by punching during an attack. When the item object a that imparts a wind attack is attached to the left hand of the second character C2, the second character C2 is allowed to perform the action of blowing a gust of wind during the attack.

Thus, the function exhibited by the item object a attached to a part of the second character C2 (e.g., in the present example, blowing a gust of wind) is not exhibited on the assumption that the basic attack function of the part of the second character C2 to which the item object a is attached is exhibited (e.g., the function of destroying another object impacted), and is exhibited independently of the exhibition of the basic attack function (i.e., without the assumption that the basic attack function is exhibited). It should be noted that in the present example, the function exhibited by the item object a attached to a part of the second character C2 is exhibited during an attack action using the part to which the item object a is attached, and is not exhibited when an attack action is performed using other parts of the second character C2 or when an attack action itself is not performed.

Next, an example of a method of attaching an item object to the second character C2 will be described with reference to FIG. 13. As described above, a plurality of item objects are disposed on a game field in the virtual space. In a state in which an item object can be attached to a part of the second character C2, the item object that can be attached is displayed in a display form that is different from that of items other than the item object that can be attached. Specifically, when an item object is attached to the second character C2, an item object disposed in the virtual space is displayed in a color that is different from that of other objects, is displayed with an effect image added thereto, or is displayed with an effect image different from those that are added to other objects. In the example of FIG. 13, item objects a to d are displayed in a display form that is different from that of a tree object OBJ, which is not an item object (it should be noted that in FIG. 13, the difference in display form is represented by hatching). As a result, in a state in which a game image indicating a game field is displayed, item objects that can be attached, of the objects on the game field, can be presented in a manner that allows the user to easily recognize the item objects. It should be noted that item objects that are displayed in a display form that is different from that of other objects, may be item objects within a determination range described below, of the item objects disposed on a game field, even when attached to the second character C2.

In addition, in a state in which an item object can be attached, an item object of interest that is to be subjected to an attachment process, of item objects, is specified by the user performing an operation of choosing an attachment target part of the second character C2 to which an item object is to be attached. In the present example, an item object can be attached to the left hand, the right hand, and the back of the second character C2, and one of these parts is chosen as an attachment target part to which an item object is to be attached. Thereafter, as illustrated in FIG. 13, an effect image is added to the item object of interest that is to be subjected to an attachment process to the chosen attachment target part. In the example of FIG. 13, the item object a is an item object of interest, and an effect image is added to the item object a.

An item object of interest that is to be attached to the second character C2 may be one that is within a determination range similar to that which is used when an item object is combined to generate a combination weapon object. Specifically, an item object of interest that is to be attached to the second character C2 may be one of item objects within a determination range with reference to the location of the second character C2 that is closest to the second character C2, that is closest to an attachment part of the second character C2, or that is determined based on the location and orientation of the second character C2.

Thus, by adding an effect image to an item object of interest that is to be subjected to an attachment process to the second character C2, the item object of interest that is to be subjected to the attachment process can be presented to the user in an easy-to-understand manner with a game image indicating a game field displayed. It should be noted that the effect image may be any image that allows the user to distinguish the item object of interest that is to be subjected to the attachment process from other item objects.

As illustrated in FIG. 13, an effect image indicating that an item object is to be subjected to the attachment process to the second character C2 has a shape suggesting that the item object a, which is an item object of interest, is linked to a part of the second character C2 to which the item object a is to be attached (the left hand in the example of FIG. 13). Specifically, the effect image can be presented, associating the item object of interest with an attachment target part of the second character C2 that is to be subjected to the attachment process. Thereafter, the item object is attached to the part of the second character C2 that is associated with the item object by the effect image. Therefore, the effect image can present, to the user, a part to which the user is to attach an item object and the item object to be attached, in an easy-to-understand manner.

In FIG. 13, when the user gives an attachment command with the effect image displayed, the item object of interest disappears from the game field, and is attached to the chosen attachment target part. FIG. 12 illustrates a situation in which the item object a is attached to the left hand of the second character C2, resulting in an appearance in which a portion of the left hand of the second character C2 is replaced by the item object a. For example, when the item object a is attached, a scene is displayed in which the item object a moves and approaches the chosen part, and thereafter, a portion of the part is changed into the item object a.

As illustrated in FIG. 12, the item object a attached to the second character C2 has an appearance in which at least a portion of the attachment part is replaced by the item object a. Thus, a part of the second character C2 to which an item object is attached has an appearance including at least a portion of an appearance of the part (e.g., the left hand of the second character C2) to which the item object is attached and at least a portion of an appearance of the attached item object (e.g., the item object a).

It should be noted that in the example of FIG. 12, a portion of an appearance of the left hand as an attachment part is replaced by all of an appearance of the item object a. It should be noted that all of an appearance of an attachment part may be combined with all or a portion of an appearance of an item object (i.e., an appearance in which an item object is held by the left or right hand of the second character C2, or an appearance in which an item object is attached to the back of the second character C2). In addition, a portion of an appearance of an attachment part may be replaced by a portion of an appearance of an item object. Thus, the attachment of an item object to the second character C2 in the present example includes an embodiment in which at least a portion of a part of the second character C2 is replaced by at least a portion of an item object, an embodiment in which at least a portion of an item object is held by a part of the second character C2, an embodiment in which at least a portion of an item object is attached to a part of the second character C2, and an embodiment in which at least a portion of an item object is combined with a part of the second character C2.

In a state in which an item object can be attached to the second character C2, a rendering process may be executed so as to display at least a portion of the second character C2 in a translucent form (e.g., the entirety of the second character C2 including a portion of an item object already attached is translucent, the entirety of the second character C2 excluding a portion of an item object already attached is translucent, or the attachment target part is translucent). It should be noted that in FIG. 13, dashed lines indicate that the entirety of the second character C2 is translucent. This prevents an item object from being hidden behind the second character C2 and being unseen, and therefore, an item object attached to the second character C2 can be presented to the user in an easy-to-understand manner.

An item object can add an ability or function to a part of the second character C2 to which the item object is attached. For example, when an item object is attached to a part of the second character C2, the ability value of the part of the second character C2 can be improved, or a function that is not possessed by the part can be added to the part. For example, as an example of the former, attack power or defensive power that is exhibited using a part of the second character C2 may be improved when an item object is attached to the part of the second character C2, or movement speed or jumping ability that is exhibited using a part of the second character C2 may be improved when an item object is attached to the part of the second character C2, resulting in an improvement in the ability value. Examples of the latter include the function of providing thrust to an attachment part when an item object that provides thrust is attached thereto, the function of extending an attack range of an attack using an attachment part when an item object that extends is attached thereto, and the function of blowing a gust of wind or projecting fire from an item object that blows a gust of wind or projects fire when the item object is attached thereto. As an example, the item object a illustrated in FIG. 12 has the function of blowing a gust of wind during an attack when a leaf object that is an item object which imparts a wind attack is attached to a part of the second character C2 that can perform a hitting attack.

It should be noted that the second character C2 may be equipped with different item objects at different parts thereof to which an item object can be attached. In that case, the second character C2 can perform the action of attacking using one of attached item objects that is chosen according to the user's operation. Specifically, when the user chooses a part that is to be used in an attack and gives an action command to attack, then if an item object is attached to the part, the second character C2 is caused to perform the action of attacking using the item object according to the action command. It should be noted that in another example, the number of item objects with which the second character C2 is allowed to be simultaneously equipped is one.

In the present example, the second character C2 is provided with energy for performing an action with the first character C1 sitting thereon. For example, when the second character C2 performs an action as a player character (i.e., performing an action with the first character C1 sitting thereon), the energy of the second character C2 is consumed, depending on the details or time of the action. For example, when the second character C2 performs the action of moving, the action of attacking, the action of defending, or the like, the energy of the second character C2 is consumed in a predetermined amount depending on the type or time of the action. In addition, when the second character C2 does not perform an action that consumes the energy, the energy of the second character C2 recovers by a predetermined amount depending on a period of time during which the action is not performed. As illustrated in FIGS. 12 and 13, in the present example, the energy gauge E is displayed, indicating, by a gauge amount, the remaining amount of the energy of the second character C2.

In the present example, when the energy of the second character C2 remains, the second character C2 is in a normal action state in which the second character C2 is allowed to normally perform an action. On the other hand, when the energy of the second character C2 is recovering from zero to the maximum (referred to as a "charge state"), the second character C2 is in an abnormal action state in which the second character C2 is not allowed to normally perform an action. It should be noted that in the abnormal action state, the movement speed or operating speed of the second character C2 may be lower than in the normal action state, or the second character C2 is not allowed to perform an attack action or defensive action.

The energy of the second character C2 is consumed in a predetermined amount depending on a period of time during which the energy consuming action is performed, and therefore, the remaining amount of the second character C2 shown by the energy gauge E is reduced, depending on the energy consumption, and is then displayed. In addition, the energy recovers by a predetermined amount depending on a period of time during which the energy consuming action is not performed. Therefore, the remaining amount shown by the energy gauge E is increased, depending on the recovery of the energy, and is then displayed. Furthermore, when the energy of the second character C2 is zero, the charge state will start and continue until the energy recovers to the maximum, during which the second character C2 is in the abnormal action state. It should be noted that in the present example, when the first character C1 is put down from the second character C2, and the second character C2 is switched to a mode (the first mode) in which the second character C2 performs an action under automatic control, the energy of the second character C2 is controlled so as to recover, depending on the period of time that has passed since the mode switching, no matter what action is performed by the second character C2 under the automatic control.

It should be noted that in the charge state, a scene is also displayed in which the gauge amount of the energy gauge E of the second character C2 recovers, depending on the period of time that has passed. Furthermore, the gauge amount of the energy gauge E of the second character C2 may be displayed in a display form different from when the second character C2 is in the normal recovery state, i.e., a display form indicating that the second character C2 is in the charge state (e.g., flickering, changing colors, or changing sizes). In the charge state, when the energy recovers to the maximum gauge amount of the energy gauge E, the energy gauge E returns to the normal display form, the charge state is removed, and the second character C2 is switched to the normal action state. It should be noted that the amount of recovery of the energy of the second character C2 per unit time in the charge state and the amount of recovery of the energy of the second character C2 per unit time in states other than the charge state may be the same or different.

Thus, the displaying of the energy gauge E of the second character C2 allows the user to more easily recognize changes or the state (the normal action state or the movement action state) of the energy of the second character C2.

As another example of an item object that is attached to the second character C2, an item object d that imparts the function of projecting fire to a part to which the item object is attached, and consumes the energy of the second character C2 due to the fire projection, will be described with reference to FIG. 14.

The item object d of FIG. 14 has the function of projecting fire. When the second character C2 performs an attack action in the normal action state, the second character C2 is allowed to project fire from the item object d attached thereto. On the other hand, if the second character C2 is in the abnormal action state, then even when the user performs an operation of causing the second character C2 to perform an attack action, the second character C2 is not allowed to project fire from the item object d attached thereto.

As described above, the second character C2 is provided with energy. When the second character C2 performs the action of projecting fire from the item object d, the consumed amount of the energy increases. For example, the energy of the second character C2 is consumed in a predetermined amount depending on a period of time during which the second character C2 performs the action of projecting fire from the attached item object d, in addition to energy consumption due to other actions. When the energy of the second character C2 is zero and the second character C2 is then in the charge state, the second character C2 is in the abnormal action state and is not allowed to project fire from the item object d.

Thus, the item object d attached to the second character C2 is enabled or disabled to exhibit the function, depending on the state of the remaining energy of the second character C2. For the item object d, when the second character C2 is in the normal action state, the second character C2 is allowed to perform the action of projecting fire from the item object d under a predetermined condition (e.g., a condition that the second character C2 or the like has performed an attack using the item object d). Thus, the item object d is an energy consuming object in which the energy of the second character C2 is consumed due to the fire projection. On the other hand, for the item object a, even when the second character C2 performs an attack of blowing a gust of wind from the item object a attached thereto, the energy of the second character C2 is not consumed. Therefore, the item object a is not an energy consuming object, like when the item object a is combined to synthesize a combination weapon object.

As illustrated in FIG. 14, the second character C2 is wearing the item object d on the left hand. As illustrated in FIG. 14, when the second character C2 performs an attack action using the left hand in the normal action state according to the user's operation, the item object d attached to the left hand projects fire. When the fire projected by the item object d hits the opponent character EC, the fire can cause predetermined damage to the opponent character EC. In addition, as the item object d is attached to the left hand of the second character C2, the second character C2 also exhibits a basic attack function performed by the attack action of punching with the left hand which "makes an impact on another object contacted", by the user causing the second character C2 to perform an attack action with the left hand. For example, when the left hand to which the item object d is attached is waved to be brought into direct contact with the opponent character EC, the impact can cause predetermined damage to the opponent character EC. Thus, the function (e.g., fire projection in the present example) that is exhibited by the item object d attached to the second character C2 in the normal action state is not exhibited on the assumption that the basic attack function of the part to which the item object d is attached is exhibited, and is exhibited independently of the exhibition of the basic attack function. It should be noted that in the present example, the function that is exhibited by the item object d attached to the second character C2 is also exhibited when an attack action is performed using the item object d, and is not exhibited if, even when the second character C2 is in the normal action state, an attack action is not performed.

It should be noted that the above item durability value may also be set for an item object attached to the second character C2. The item durability value of the attached item object may be set to any value, e.g., a predetermined item durability value or an item durability value immediately before the attachment. For example, the game system 1 reduces the item durability value, depending on the use of the item object attached to the second character C2. When the item durability value is zero, the item object will disappear. As an example, the item durability value is reduced by a predetermined value each time the second character C2 performs an action using the item object once. It should be noted that the item durability value may be reduced, depending on the number of times the second character C2 has performed an action using the item object, or a period of time during which the second character C2 has performed an action using the item object. In addition, some item objects that are attached to the second character C2 may not have the item durability value. In that case, an item object that does not have the item durability value may not be able to be combined with the second character C2.

Here, when the item durability value of an item object attached to the second character C2 is zero, the item object will disappear, and a part to which the item object was attached will be returned to the item object unattached state. In that case, the item object that was attached will not be returned, and therefore, the item object and the part to which the item object was attached will not be separated from each other.

Thus, in a state in which an item object is attached to the second character C2, the item durability value is set for the item object, properties (i.e., properties of having a durability value) of the item object can be inherited to a part of the second character C2 to which the item object is attached. In addition, when the item durability value of the attached item object is zero, a game scene will be displayed in which the portion having an appearance of the attached item object disappears from the second character C2. Therefore, the item object attached to the second character C2 can be changed in a way that is easily recognized by the user. It should be noted that a weapon object that is returned from an item object may be returned in a state in which the second character C2 is wearing the weapon object, or in a state in which the weapon object is disposed on a game field (e.g., at or near a foot of the second character C2).

It should be noted that when a part of the second character C2 that is designated as one to which an item object is to be attached has already had another item object attached thereto, the item object already attached may be removed or deleted, and the newly designated item object may be attached to the part. In that case, when an item use command to attach the newly designated item object to the designated part is given, a series of processes that is a combination of a process of removing or deleting the item object already attached and a process of attaching the newly designated item object may be executed. As another example, after the process of removing or deleting the item object already attached is executed earlier according to the user's command to remove the item object already attached, the newly designated item object may be attached to the part from which the previous item object has been removed according to an item use command that is newly given.

A relationship between performance of an attack using a combination weapon object and performance of an attack using a part of the second character C2 to which an item object is attached will be described with reference to FIGS. 15 and 16. FIG. 15 is a diagram illustrating an example of a relationship between weapon objects, item objects, and combination weapon objects generated based on these objects. In the example of FIG. 15, of objects appearing in a game, weapon objects that can be used for synthesis of a combination weapon object are indicated by Y1 to Yn (n is a natural number: in FIG. 15, the weapon objects Y1 to Y4 are illustrated), and item objects that can be used for synthesis of a combination weapon object are indicated by X1 to Xn (n is a natural number: in FIG. 15, the item objects X1 to X4 are illustrated). In the present example, as illustrated in FIG. 15, for all combinations of the weapon objects Y1 to Yn with the item objects X1 to Xn, combination weapon objects Z11 to Znn (in FIG. 15, the combination weapon objects Z11 to Z14, Z21 to Z24, Z31 to Z34, and Z41 to Z44 are illustrated) are set as a result of the combination process. Thus, each of the weapon objects Y1 to Yn, which can be used in the combination process, can be combined with all of the item objects X1 to Xn, which can be used in the combination process.

The performance of a combination weapon object is a combination of the function of an original weapon object and the performance of an item object that is combined with the weapon object. For example, the combination weapon object Z22 that is generated by combining the item object X2 having the function of giving an electric attack with the weapon object Y2 that is a sword object having the function of slashing an attack target, has the performance of slashing with the combination weapon object Z22 covered with electric light (or the performance of slashing while emitting electric light). As a result, an attack using the combination weapon object Z22 can cause damage to an attack target with the additional effect of giving the electric attack of the item object X2 combined being added to the attack effect of slashing of the original weapon object Y2. It should be noted that in some embodiment of an attack using the combination weapon object Z22, one of the attack effect of slashing of the original weapon object Y2 and the additional effect of giving an electric attack of the item object X2 combined may have an effect on an attack target.

It should be noted that a performance that an item object adds to a combination weapon object may be chosen to vary depending on the original weapon object (e.g., a different effect (damage) on an attack target). Alternatively, a performance that an item object adds to a combination weapon object may be the same irrespective of the original weapon object.

In addition, a predetermined function that is possessed by an item object does not need to be exactly the same as a function that is added to a combination weapon object by the item object being combined. The two functions may be considered to be the same as long as the user can recognize that the two functions are associated with each other. For example, concerning the item object d and the combination weapon object β, the functions of the two objects can be considered to be the same if both of the two objects have the function of "producing fire" in a broad sense, and this is the case even if there is a difference in the size of fire, the intensity of fire, the form of fire, the length of time of continuation of fire, or the like therebetween.

FIG. 16 is a diagram illustrating an example of a relationship between item objects and parts of the second character C2 to which the item objects are attached. In the example of FIG. 16, of objects appearing in a game, item objects that can be attached to the second character C2 are indicated by X1 to Xn (n is a natural number: in FIG. 16, the item objects X1 to X4 are illustrated), and parts of the second character C2 to which an item object can be attached are the left hand, the right hand, and the back. In the present example, as illustrated in FIG. 16, all combinations of the item objects X1 to Xn with the parts (the left hand, the right hand, and the back) of the second character C2 are provided with a function that is added by the item object. Thus, the parts of the second character C2 to that an item object can be attached can be subjected to the attachment process for all of the item objects X1 to Xn that can be attached.

The performance of a part of the second character C2 to which an item object is attached is a combination of the function of the part and the performance of the item object attached to the part. For example, when the item object X2 that has the function of giving an electric attack is combined with the left hand of the second character C2, which has the function of making an impact on an attack target, the left hand of the second character C2 has the performance of emitting electric light from the left hand (or the performance of punching with the left hand covered with electric light). As a result, an attack using the left hand of the second character C2 with the item object X2 attached thereto can cause damage to an attack target in addition to the additional effect of giving an electric attack to the attack target that is provided by the item object X2 attached thereto. It should be noted that in some embodiment of an attack using the left hand of the second character C2, damage may be caused to an attack target with the additional effect of giving an electric attack of the item object X2 attached thereto being added to the attack effect of making an impact with the left hand.

It should be noted that a performance that is added to a part of the second character C2 by an item object being attached thereto may be chosen to vary depending on the attachment part (e.g., a different effect (damage) on an attack target). In addition, a performance that an item object adds to a part of the second character C2 when attached thereto may be the same irrespective of the attachment part.

In addition, a predetermined function that is possessed by an item object does not need to be exactly the same as a function that is added to an attachment part by the item object being attached thereto. The two functions may be considered to be the same as long as the user can recognize that the two functions are associated with each other. For example, concerning the item object d and a part to which the item object d is attached, the functions of the two objects can be considered to be the same if both of the two objects have the function of "producing fire" in a broad sense, and this is the case even if there is a difference in the size of fire, the intensity of fire, the form of fire, the length of time of continuation of fire, or the like therebetween.

In addition, although in the above examples, an item object is attached to the second character C2, the above weapon objects and combination weapon objects may be able to be attached to the second character C2. In that case, as with the above item object of interest, a weapon object on a game field may be chosen as an object to be attached, and may be attached to an attachment target part of the second character C2. In addition, a weapon object attached to the second character C2 may be used to generate a combination weapon object including the weapon object that is a constituent element, by the second character C2 performing the action of generating the combination weapon object, as in the embodiment in which the first character C1 synthesizes a combination weapon object.

Thus, a function that is added to a combination weapon object by an item object being combined and a function that is added to a part of the second character C2 to which the same item object is attached are the same or are considered to be the same as long as the user can recognize that the two functions are associated with each other. For example, the function of performing an attack using covering fire (or an attack by projecting fire) is added to a combination weapon object including the item object X4 having the function of imparting a fire attack, and the function of performing an attack by projecting fire is added to a part of the second character C2 to which the same item object X4 is added, and therefore, the combination weapon object and the part of the second character C2 have the same function of "generating fire" added thereto.

Figure 17:
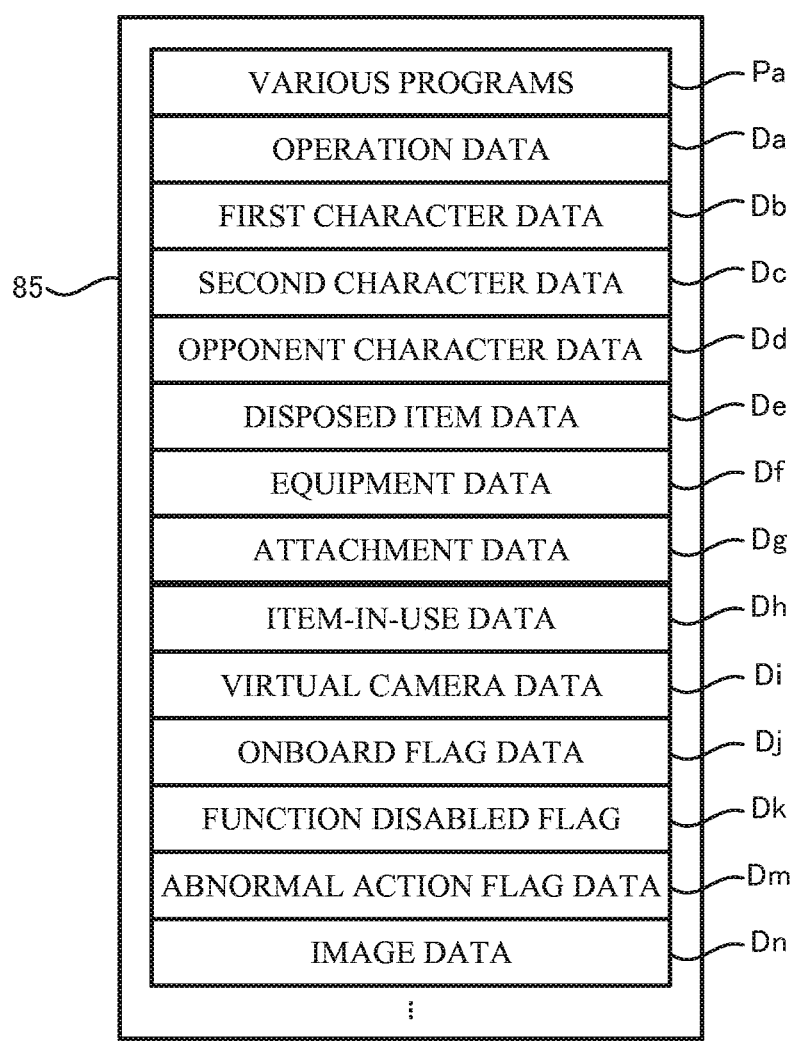
FIG. 17 is a diagram illustrating a non-limiting example of a data area set in a DRAM 85 of a main body apparatus 2.

Next, an example of a specific process that is executed in the game system 1 will be described with reference to FIG. 17. FIG. 17 is a diagram illustrating an example of a data area set in the DRAM 85 of the main body apparatus 2. It should be noted that in addition to the data of FIG. 17, the DRAM 85 also stores data used in other processes, which will not be described in detail.

Various programs Pa that are executed in the game system 1 are stored in a program storage area of the DRAM 85. In the present example, the programs Pa include an application program (e.g., a game program) for performing information processing based on data obtained from the left controller 3 and/or the right controller 4 and the main body apparatus 2, and the like. Note that the programs Pa may be previously stored in the flash memory 84, may be obtained from a storage medium removably attached to the game system 1 (e.g., a predetermined type of storage medium attached to the slot 23) and then stored in the DRAM 85, or may be obtained from another apparatus via a network, such as the Internet, and then stored in the DRAM 85. The processor 81 executes the programs Pa stored in the DRAM 85.

In addition, the data storage area of the DRAM 85 stores various kinds of data that are used in processes that are executed in the game system 1 such as information processes. In the present example, the DRAM 85 stores operation data Da, first character data Db, second character data Dc, opponent character data Dd, disposed item data De, equipment data Df, attachment data Dg, item-in-use data Dh, virtual camera data Di, onboard flag data Dj, function disabled flag data Dk, abnormal action flag data Dm, image data Dn, and the like.

The operation data Da is obtained, as appropriate, from each of the left controller 3 and/or the right controller 4 and the main body apparatus 2. As described above, the operation data obtained from each of the left controller 3 and/or the right controller 4 and the main body apparatus 2 includes information about an input from each input section (specifically, each button, an analog stick, or a touch panel) (specifically, information about an operation). In the present example, operation data is obtained from each of the left controller 3 and/or the right controller 4 and the main body apparatus 2. The obtained operation data is used to update the operation data Da as appropriate. It should be noted that the operation data Da may be updated for each frame that is the cycle of a process executed in the game system 1, or may be updated each time operation data is obtained.

The first character data Db indicates the place, orientation, and position, and action and state in the virtual space, and the like of the first character C1 disposed in the virtual space. The second character data Dc indicates the place, orientation, and position, and action and state (including remaining energy) in the virtual space, and the like of the second character C2 disposed in the virtual space. The opponent character data Dd indicates the place, orientation, and position, and action and state in the virtual space, and the like of the opponent character EC disposed in the virtual space.

The disposed item data De indicates the location and type of an item object(s) disposed on a game field.

The equipment data Df indicates a weapon object(s) and a combination weapon object(s) that the first character C1 is wearing, and one(s) of the weapon objects and the combination weapon objects that is being used (e.g., being held) by the first character C1 and a state thereof (the durability of a weapon object being used and the durability of a weapon object that is a constituent element of a combination weapon object being used).

The attachment data Dg indicates an item object that is attached to each part of the second character C2.

The item-in-use data Dh indicates conditions (e.g., remaining energy and durability) of an item object (including an item object included in a combination weapon object and an item object attached to the second character C2) that is ready to be used by the first character C1 or the second character C2.

The virtual camera data Di indicates the location, orientation, angle of view, and the like of a virtual camera disposed in the virtual space.

The onboard flag data Dj indicates an onboard flag that is set on when the first character C1 is sitting on the second character C2.

The function disabled flag data Dk indicates a function disabled flag that is set on when a combination weapon object carried by the first character C1 is in the function disabled state.

The abnormal action flag data Dm indicates an abnormal action flag that is set on when the second character C2 is in the abnormal action state.

The image data Dn is used to display, on a display screen (e.g., the display 12 of the main body apparatus 2), images (e.g., an image of the first character C1, an image of the second character C2, an image of the opponent character EC, images of other characters, images of virtual objects such as weapon objects and item objects, an image of a field in the virtual space, and a background image).

Figure 18:
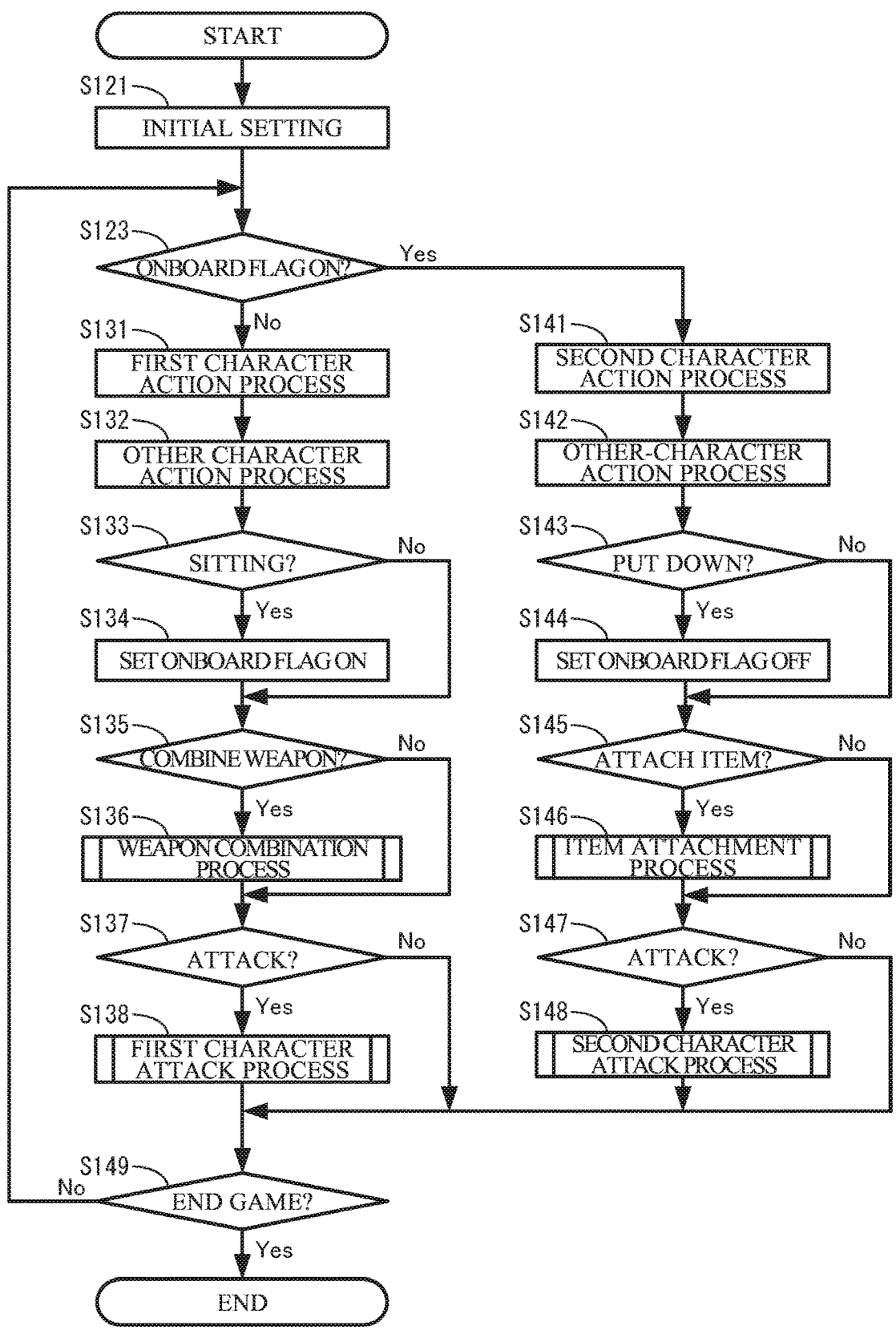
FIG. 18 is a flowchart illustrating a non-limiting example of a game process that is executed in the game system 1.
Figure 19:
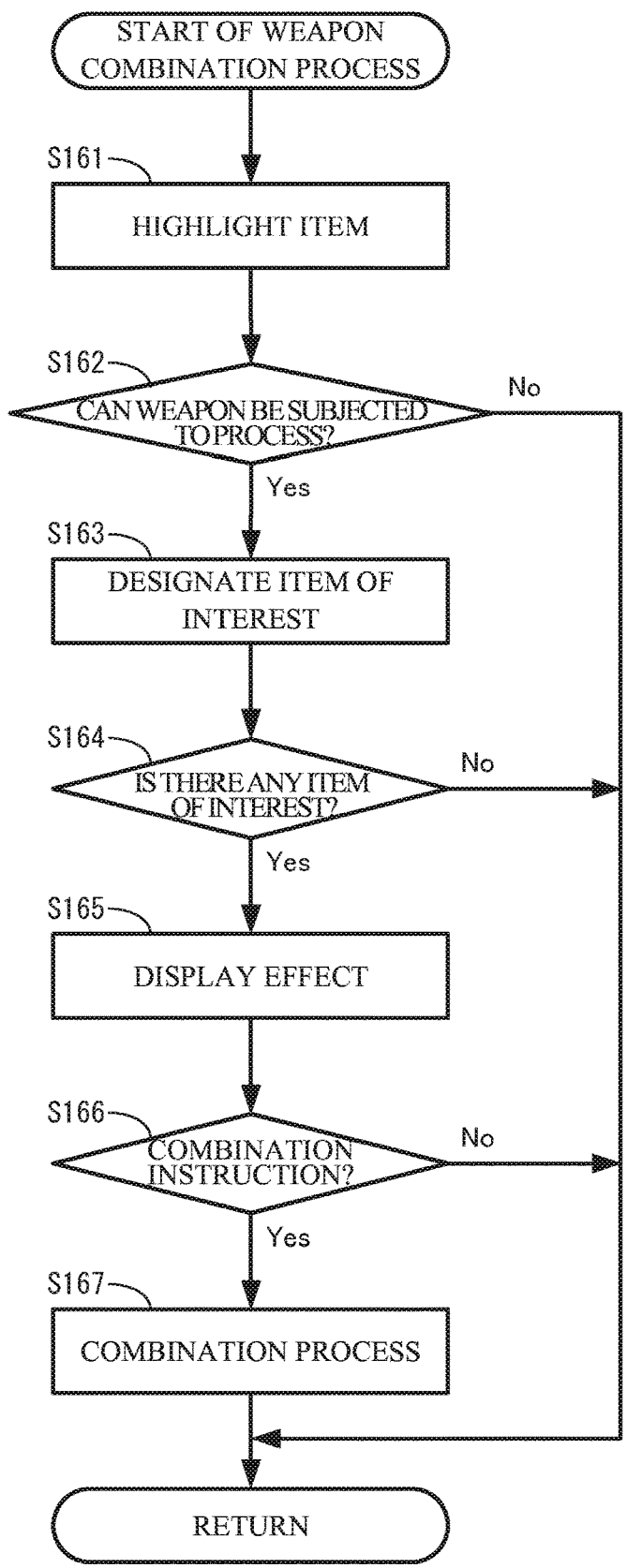
FIG. 19 is a subroutine illustrating a non-limiting example of a weapon combination process of step S136 of FIG. 18.
Figure 20:
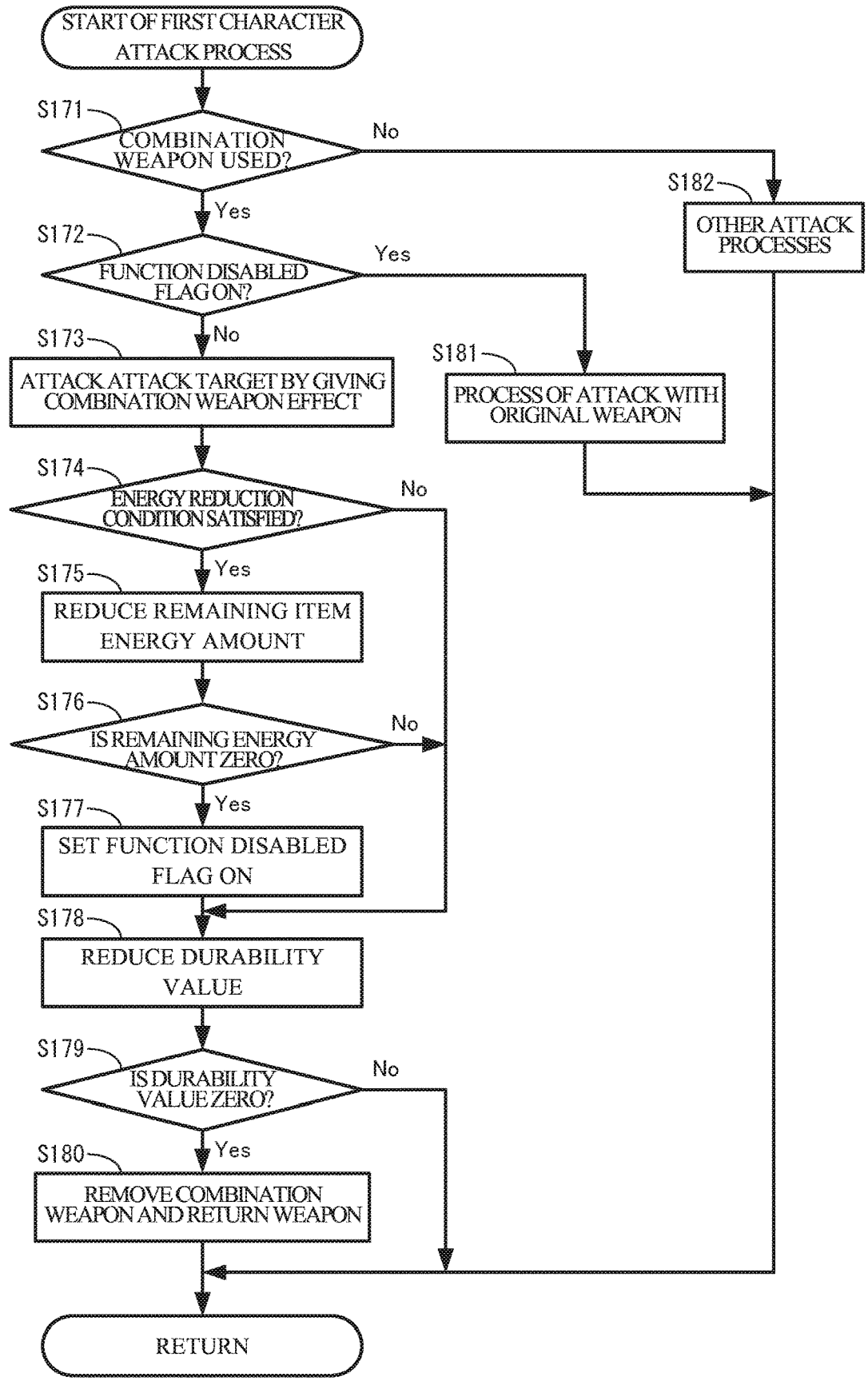
FIG. 20 is a subroutine illustrating a non-limiting example of a first character attack process of step S138 of FIG. 18.
Figure 21:
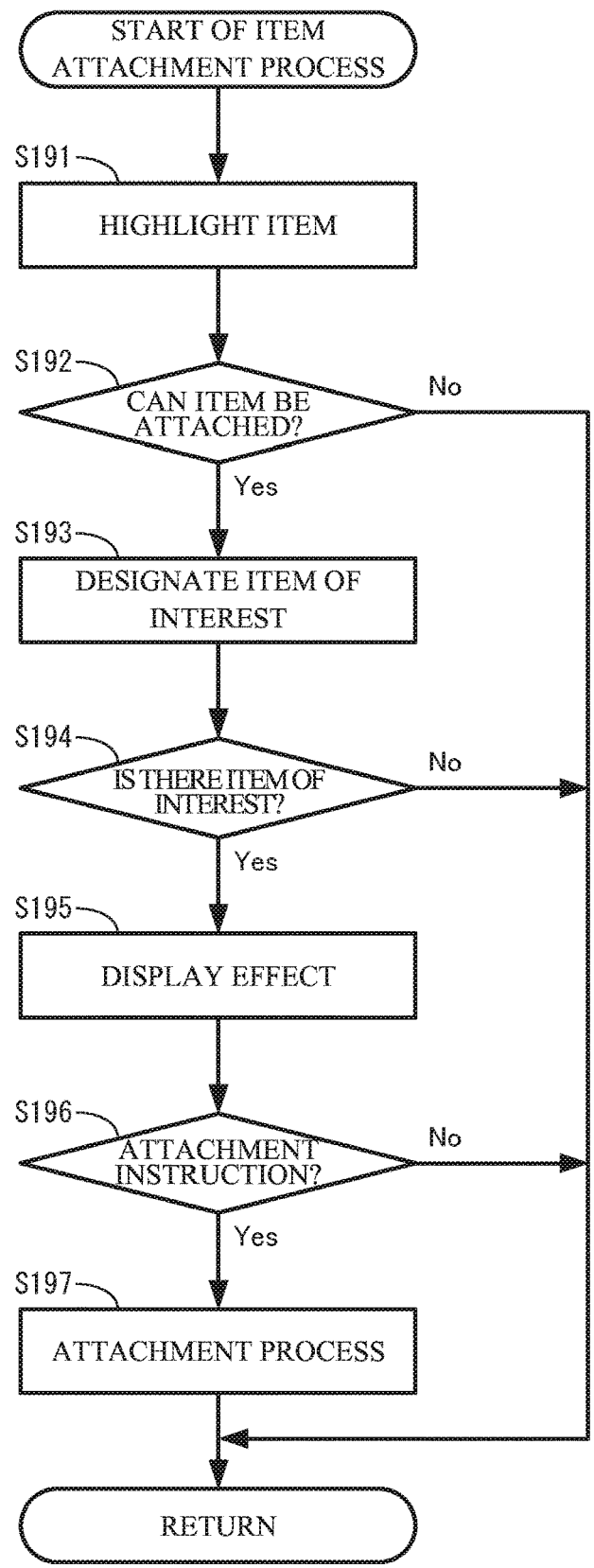
FIG. 21 is a subroutine illustrating a non-limiting example of an item attachment process of step S146 of FIG. 18.
Figure 22:
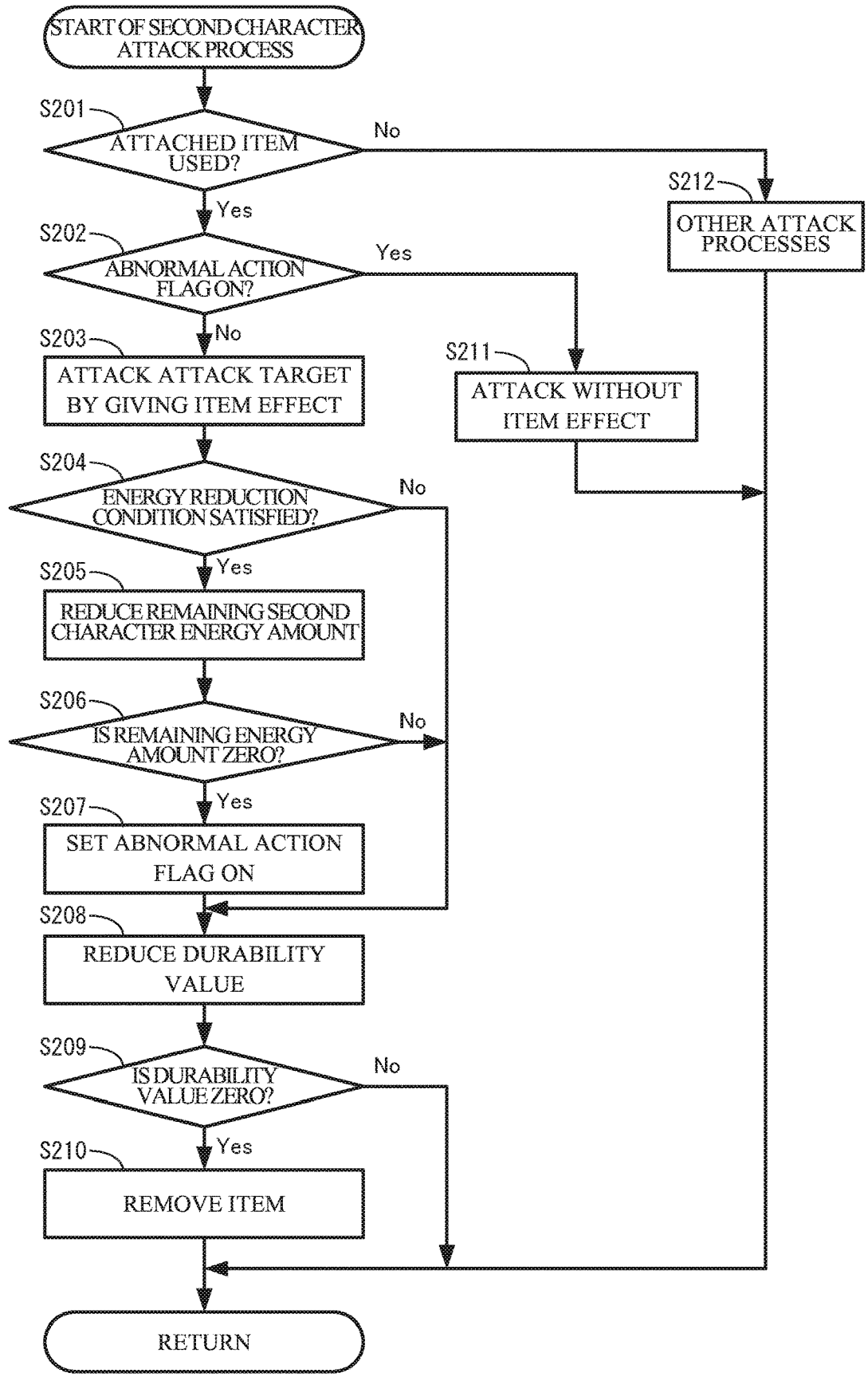
FIG. 22 is a subroutine illustrating a non-limiting example of a second character attack process of step S148 of FIG. 18.
Figure 23:
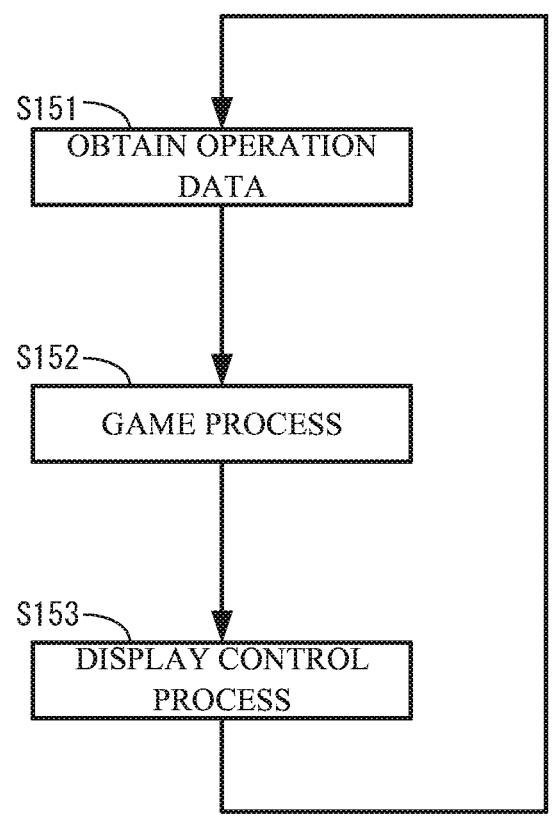
FIG. 23 is a flowchart illustrating a non-limiting example of a process that is executed for each frame in the game process indicated by the flowcharts of FIGS. 18 to 22.

Next, a detailed example of a game process that is an example of an information process in the present example will be described with reference to FIGS. 18 to 23. FIG. 18 is a flowchart illustrating an example of a game process that is executed in the game system 1. FIG. 19 is a subroutine illustrating an example of a weapon combination process of step S136 of FIG. 18. FIG. 20 is a subroutine illustrating an example of a first character attack process of step S138 of FIG. 18. FIG. 21 is a subroutine illustrating an example of an item attachment process of step S146 of FIG. 18. FIG. 22 is a subroutine illustrating an example of a second character attack process of step S148 of FIG. 18. FIG. 23 is a flowchart illustrating an example of a process that is executed for each frame in the game process indicated by the flowcharts of FIGS. 18 to 22. In the present example, a series of steps illustrated in FIGS. 18 to 23 are executed by the processor 81 executing a predetermined application program (game program) included the programs Pa. The game processes of FIGS. 18 to 23 are started with any appropriate timing.

It should be noted that the steps in the flowcharts of FIGS. 18 to 23, which are merely illustrative, may be executed in a different order, or another step may be executed in addition to (or instead of) each step, if a similar effect is obtained. In the present example, it is assumed that the processor 81 executes each step of the flowcharts. Alternatively, a portion of the steps of the flowcharts may be executed by a processor or dedicated circuit other than the processor 81. In addition, a portion of the steps executed by the main body apparatus 2 may be executed by another information processing apparatus that can communicate with the main body apparatus 2 (e.g., a server that can communicate with the main body apparatus 2 via a network). Specifically, the steps of FIGS. 18 to 23 may be executed by a plurality of information processing apparatuses including the main body apparatus 2 cooperating with each other.

In FIG. 18, the processor 81 performs initial setting for the game process (step S121), and proceeds to the next step. For example, in the initial setting, the processor 81 initializes parameters for performing steps described below, and updates each data. As an example, the processor 81 disposes various objects, characters, and the like on a game field in a virtual space to generate an initial state of the virtual space, and updates the disposed item data De. In addition, the processor 81 disposes the first character C1, the second character C2, the opponent character EC, and a virtual camera in predetermined positions at default locations in the virtual space in the initial state, and updates the first character data Db, the second character data Dc, the opponent character data Dd, and the virtual camera data Di.

Next, the processor 81 determines whether or not the onboard flag is on, with reference to the onboard flag data Dj (step S123). If the onboard flag is off, the processor 81 proceeds to step S131. Otherwise, i.e., if the onboard flag is on, the processor 81 proceeds to step S141.

In step S131, the processor 81 executes a first character action process, and proceeds to the next step. For example, the processor 81 sets an action of the first character C1 based on the operation data Da. As an example, the processor 81 sets the place, orientation, position, action, state, and the like of the first character C1 based on an operation input indicated by the operation data Da and virtual physical calculation (e.g., Newton's first law or Newton's law of universal gravitation) in the virtual space, and the like, and updates the first character data Db.

The action of the first character C1 includes an action that is performed using a weapon object or a combination weapon object, and the like. For example, when the user gives a command to change weapon objects or combination weapon objects with which the first character C1 is equipped, the processor 81 changes the weapon object or combination weapon object of the first character C1 according to the command, and updates the equipment data Df based on the change. In addition, when the user gives an attack action command, the processor 81 causes the first character C1 to perform the action of using the weapon object or combination weapon object based on the equipment data Df (e.g., attacking by waving a weapon object or combination weapon object being held).

In addition, in step S131, if the first character C1 is equipped with a combination weapon object, and the function disabled flag indicated by the function disabled flag data Dk is on, the processor 81 increases the remaining energy of an item object included in the combination weapon object by a predetermined amount, and updates the item-in-use data Dh. If the remaining energy of the item object recovers to the maximum with the function disabled flag indicated by the function disabled flag data Dk on, the processor 81 sets the function disabled flag indicated by the function disabled flag data Dk off, and updates the item-in-use data Dh based on the state of the recovery.

Next, the processor 81 executes an other-character action process (step S132), and proceeds to the next step. For example, the processor 81 disposes characters (e.g., the second character C2 and the opponent character EC) other than the first character C1, controls actions of those other than the first character C1 according to rules previously determined in a game program, and updates the second character data Dc and the opponent character data Dd.

In addition, in step S132, the processor 81 increases the remaining energy of the second character C2 by a predetermined amount, and updates the second character data Dc. Thereafter, if the remaining energy of the second character C2 recovers to the maximum with the abnormal action flag indicated by the abnormal action flag data Dm on, the processor 81 sets the abnormal action flag indicated by the abnormal action flag data Dm off, and updates the second character data Dc based on the state of the recovery.

Next, the processor 81 determines whether or not the first character C1 is performing the action of sitting on the second character C2 (step S133). For example, if in step S131 control has been performed according to the user's operation to cause the first character C1 to start the action of sitting on the second character C2, the result of the determination by the processor 81 in step S133 is positive. If the first character C1 is performing the action of sitting on the second character C2, the processor 81 proceeds to step S134. Otherwise, i.e., if the first character C1 is not performing the action of sitting on the second character C2, the processor 81 proceeds to step S135.

In step S134, the processor 81 sets the onboard flag on, and proceeds to step S135. For example, the processor 81 sets the onboard flag on, and updates the onboard flag data Dj.

In step S135, the processor 81 determines whether or not to execute a weapon combination process. For example, if the first character C1 is performing an action that allows generation of a combination weapon object, the result of the determination by the processor 81 in step S135 is positive. For example, if the first character C1 is allowed to use an item object and is holding a weapon object in a game, the result of the determination in step S135 is positive, and a weapon combination process described below is started. The result of the determination in step S135 is also positive if the weapon combination process is being executed. The result of the determination in step S135 is negative if the state of the first character C1 is removed during the weapon combination process or if a combination process described below is executed. If the processor 81 determines to execute the weapon combination process, the processor 81 proceeds to step S136. Otherwise, i.e., if the processor 81 does not determine to execute the weapon combination process, the processor 81 proceeds to step S137.

In step S136, the processor 81 executes the weapon combination process, and proceeds to step S137. The weapon combination process of step S136 will be described with reference to FIG. 19.

In FIG. 19, the processor 81 changes a setting of displaying such that an item object on a game field is highlighted (step S161), and proceeds to the next step. As a result, a game image in which the item object is highlighted (see FIG. 9) is displayed in a game image display control process (step S153), which is next executed.

Next, the processor 81 determines whether or not the weapon object that is being held by the first character C1 is one that can be used for synthesis of a combination weapon object (step S162). If the weapon object that is being held by the first character C1 is one that can be used for synthesis of a combination weapon object, the processor 81 proceeds to step S163. Otherwise, i.e., if the weapon object that is being held by the first character C1 is not one that can be used for synthesis of a combination weapon object, the processor 81 ends the subroutine. It should be noted that step S161 may be executed if the result of the determination in step S162 is positive. Specifically, the highlighting of an item object in step S161 may be executed only if the weapon object that is being held by the first character C1 is one that can be used in the combination process.

In step S163, the processor 81 designates an item object as an item object of interest, of item objects on a game field, and proceeds to the next step. It should be noted that an item object of interest is designated by the above method based on the location of the first character C1 indicated by the first character data Db. It should be noted that there is no item object of interest when the first character C1 is disposed at some location. In that case, in step S163, the processor 81 does not designate any item object of interest.

Next, the processor 81 determines whether or not there is any item object of interest on a game field, based on the process result of step S163 (step S164). If there is an item object of interest on a game field, the processor 81 proceeds to step S165. Otherwise, i.e., if there is not any item object of interest on a game field, the processor 81 ends the subroutine.

In step S165, the processor 81 changes a setting of displaying such that an effect image (see FIG. 9) that associates the weapon object carried by the first character C1 with the item object of interest is displayed, and proceeds to the next step. As a result, in a game image display control process that is next executed (step S153), a game image is displayed in a display form in which the effect image is displayed.

Next, the processor 81 determines whether or not a command to synthesize a combination weapon object has been given, based on the operation data Da (step S166). If a command to synthesize a combination weapon object has been given, the processor 81 proceeds to step S167. Otherwise, i.e., if a command to synthesize a combination weapon object has not been given, the processor 81 ends the subroutine.

In step S167, the processor 81 executes a combination process, and ends the subroutine. For example, the processor 81 generates a combination weapon object based on the weapon object of interest carried by the first character C1 and the item object of interest on the game field. Thereafter, the processor 81 changes the weapon object of interest carried by the first character C1 into a combination weapon object (see FIG. 8), and updates the equipment data Df and the item-in-use data Dh based on the change. It should be noted that the processor 81 sets the remaining energy and durability value of the item object included in the newly generated combination weapon object to respective predetermined values, and updates the item-in-use data Dh.

It should be noted that in the combination process of step S167, the item object of interest and the weapon object of interest are controlled such that the item object of interest approaches the weapon object of interest, and thereafter, disappears, and the weapon object of interest, which is carried by the first character C1, is changed into a combination weapon object.

Referring back to FIG. 18, in step S137, the processor 81 determines whether or not to perform an attack process on the first character C1. For example, the result of the determination by the processor 81 in step S137 is positive if, in step S131, the first character C1's action of attacking another character (e.g., the opponent character EC) has been set, and the first character C1 is performing the attack action. If the processor 81 determines to perform the attack process on the first character C1, the processor 81 proceeds to step S138. Otherwise, i.e., if the processor 81 does not determine to perform the attack process on the first character C1, the processor 81 proceeds to step S149.

In step S138, the processor 81 executes a first character attack process, and proceeds to step S149. The first character attack process of step S138 will be described below with reference to FIG. 20.

In FIG. 20, the processor 81 determines whether or not the second character C2 is performing the action of attacking using the combination weapon object, with reference to the equipment data Df (step S171). If the second character C2 is performing the action of attacking using the combination weapon object, the processor 81 proceeds to step S172. Otherwise, i.e., if the second character C2 is not performing the action of attacking using the combination weapon object, the processor 81 proceeds to step S182.

In step S172, the processor 81 determines whether or not the function disabled flag indicated by the function disabled flag data Dk is on. If the function disabled flag is off, the processor 81 proceeds to step S173. Otherwise, i.e., if the function disabled flag is on, the processor 81 proceeds to step S181.

In step S173, the processor 81 gives an attack effect of the combination weapon object used by the first character C1 in the attack to an attack target and thereby causes damage to an attack target, and proceeds to the next step. For example, the processor 81 causes damage to the opponent character EC as an attack target, based on a function or performance that is set for the combination weapon object used by the first character C1 in the attack (see FIG. 15), and updates the opponent character data Dd. In addition, the processor 81 provides a setting of displaying so as to display an effect (e.g., a wind attack giving effect (a gust-of-wind blowing effect) or a fire attack giving effect (the effect of covering a combination weapon object with fire) of an item object) that is caused by the attack to occur from the combination weapon object that is used by the first character C1 in the attack. As a result, in a game image display control process (step S153) that is next executed, a game image is displayed in a display form in which a scene is displayed in which a function of an item object included in a combination weapon object is added in an attack using the combination weapon object (see FIGS. 9 and 11).

Next, the processor 81 determines whether or not a condition under which the remaining energy of the item object included in the combination weapon object used in the attack by the first character C1 is satisfied (step S174). For example, if the processor 81 determines that the item object included in the combination weapon object used in the attack by the first character C1 is an energy consuming object, with reference to the equipment data Df and the item-in-use data Dh, the result of the determination by the processor 81 in step S174 is positive. If the condition under which the remaining energy is reduced is satisfied, the processor 81 proceeds to step S175. Otherwise, i.e., if the condition under which the remaining energy is reduced is not satisfied, the processor 81 proceeds to step S178.

In step S175, the processor 81 reduces the remaining energy of the item object included in the combination weapon object used in the attack by the first character C1 by a predetermined amount, updates the item-in-use data Dh, and proceeds to the next step.

Next, the processor 81 determines whether or not the remaining energy of the item object included in the combination weapon object used in the attack by the first character C1 is zero (i.e., an exhausted state), with reference to the item-in-use data Dh (step S176). If the remaining energy of the item object is zero, the processor 81 proceeds to step S177. Otherwise, i.e., if the remaining energy of the item object is not zero, the processor 81 proceeds to step S178.

In step S177, the processor 81 sets the function disabled flag on, and proceeds to step S178. For example, the processor 81 sets the function disabled flag on, and updates the function disabled flag data Dk.

In step S178, the processor 81 reduces the durability of the combination weapon object used in the attack by the first character C1 by a predetermined amount, and proceeds to the next step. For example, the processor 81 reduces the durability of each of the weapon object and the item object constituting the combination weapon object used in the attack, based on the details (the type, power, effectiveness, time, and the like) of the attack performed by the first character C1, and updates the equipment data Df and the item-in-use data Dh.

Next, the processor 81 determines whether or not the durability of the weapon object and/or the item object constituting the combination weapon object used in the attack by the first character C1 is zero, with reference to the equipment data Df and the item-in-use data Dh (step S179). If the durability of any of the weapon object and the item object is zero, the processor 81 proceeds to step S180. Otherwise, i.e., if both of the weapon object and the item object have a non-zero durability, the processor 81 ends the subroutine.

In step S180, the processor 81 causes the combination weapon object to disappear or the original weapon object to return, and ends the subroutine. For example, if the durability of the weapon object included in the combination weapon object used in the attack by the first character C1 is zero, the processor 81 causes the combination weapon object to disappear, and updates the equipment data Df and the item-in-use data Dh. In addition, if the durability of the item object included in the combination weapon object used in the attack by the first character C1 is zero, the processor 81 causes the item object included in the combination weapon object to disappear, and the weapon object that is a constituent element of the combination weapon object to return, and updates the equipment data Df and the item-in-use data Dh.

Meanwhile, if in step S172 it is determined that the function disabled flag is on, the processor 81 gives an attack effect of the weapon object that is a constituent element of the combination weapon object used in the attack by the first character C1 to the attack target and thereby causes damage to the attack target, and ends the subroutine. For example, the processor 81 causes damage to the opponent character EC as the attack target, based on a function or performance set for the weapon object that is a constituent element of the combination weapon object used in the attack by the first character C1, and updates the opponent character data Dd.

In addition, if in step S171 it is determined that a combination weapon object is not being used, the processor 81 gives an attack effect of the weapon object carried by the first character C1 or a part (e.g., a hand or foot) of the body of the first character C1 to the attack target and thereby causes damage to the attack target, based on the equipment data Df, and ends the subroutine. For example, the processor 81 causes damage to the opponent character EC as the attack target, based on a function or performance set for the weapon object used by the first character C1 in the attack or the attack ability of the first character C1 itself, and updates the opponent character data Dd.

Referring back to FIG. 18, if in step S123 it is determined that the onboard flag is on, the processor 81 executes a second character action process (step S141), and proceeds to the next step. For example, the processor 81 sets an action of the second character C2 based on the operation data Da. As an example, the processor 81 sets the place, orientation, position, action, state, and the like of the second character C2 based on an operation input indicated by the operation data Da and virtual physical calculation (e.g., Newton's first law or Newton's law of universal gravitation) in the virtual space, and the like, and updates the second character data Dc.

The action of the second character C2 includes an action that is performed using an item object attached to the second character C2, and the like. As an example, if the user's operation of choosing a part of the second character C2 to which an item object is to be attached is performed, the processor 81 causes the second character C2 to perform the action of attaching the item object to the part. As another example, if the user gives an attack action command (a command to designate a part of the second character C2 that is to be used for an attack), the processor 81 causes the second character C2 to perform the action of attacking using the part. For example, if an item object is attached to a part of the second character C2 that has been designated by the user for an attack, the processor 81 causes the second character C2 to perform an action using the item object (e.g., an attack by waving the attached item object). In addition, if the attachment data Dg indicates that an item object is not attached to a part of the second character C2 that has been designated by the user for an attack, the processor 81 causes the second character C2 to perform the action of attacking using the part itself (e.g., the action of attacking using the right hand of the second character C2).

In addition, if in step S141 the second character C2 performs an action that consumes energy (e.g., the action of moving in the virtual space), the processor 81 reduces the remaining energy of the second character C2 based on the details of the action, and updates the second character data Dc. It should be noted that in the present example, the consumption of energy due to the use of an item object attached to the second character C2 is calculated in step S148. In addition, if the second character C2 is not performing an action that consumes energy, the processor 81 increases the remaining energy of the second character C2 by a predetermined amount, and updates the second character data Dc. Thereafter, if the remaining energy of the second character C2 recovers to the maximum with the abnormal action flag indicated by the abnormal action flag data Dm on, the processor 81 sets the abnormal action flag indicated by the abnormal action flag data Dm off, and updates the item-in-use data Dh and the second character data Dc, depending on the state of the recovery.

Next, the processor 81 executes an other-character action process (step S142), and proceeds to the next step. For example, the processor 81 disposes characters (e.g., the first character C1 and the opponent character EC) other than the second character C2, controls actions of other characters according to rules previously determined in a game program, and updates the first character data Db and the opponent character data Dd.

In addition, in step S142, if the first character C1, sitting on the second character C2, is equipped with a combination weapon object that is an energy consuming object, the processor 81 increases the remaining energy of the energy consuming object (i.e., the remaining energy of an item object included in the combination weapon object) by a predetermined amount, and updates the item-in-use data Dh. Thereafter, if the remaining energy of the energy consuming object recovers to the maximum with the function disabled flag indicated by the function disabled flag data Dk on, the processor 81 sets the function disabled flag indicated by the function disabled flag data Dk off, and updates the item-in-use data Dh, depending on the state of the recovery.

Next, the processor 81 determines whether or not the second character C2 is performing the action of putting down the first character C1 (step S143). For example, if in step S141 control has been performed according to the user's operation such that the second character C2 starts the action of putting down the first character C1, the result of the determination by the processor 81 in step S143 is positive. Thereafter, if the second character C2 is performing the action of putting down the first character C1, the processor 81 proceeds to step S144. Otherwise, i.e., if the second character C2 is not performing the action of putting down the first character C1, the processor 81 proceeds to step S145.

In step S144, the processor 81 sets the onboard flag off, and proceeds to step S145. For example, the processor 81 sets the onboard flag off, and updates the onboard flag data Dj.

In step S145, the processor 81 determines whether or not to execute a process of attaching an item to the second character C2. For example, if the second character C2 is performing an action that allows attachment of an item object, the result of the determination by the processor 81 in step S145 is positive. For example, the result of the determination in step S145 is positive if in a game, the second character C2 is allowed to use an item object and is in a state in which an item object is used, and after an item attachment process described below is started, and is also positive during execution of the item attachment process. The result of the determination in step S145 is negative if during the item attachment process, the state of the second character C2 is removed or the attachment process is executed. If the processor 81 determines to execute the item attachment process, the processor 81 proceeds to step S146. Otherwise, i.e., if the processor 81 does not determine to execute the item attachment process, the processor 81 proceeds to step S147.

In step S146, the processor 81 executes the item attachment process, and proceeds to step S147. The item attachment process of step S146 will be described below with reference to FIG. 21.

In FIG. 21, the processor 81 changes a setting of displaying such that the item object on the game field is highlighted (step S191), and proceeds to the next step. As a result, a game image is displayed in a display form (see FIG. 13) in which the item object is highlighted in a game image display control process which is next executed (step S153).

Next, the processor 81 determines whether or not an item object can be attached to a part of the second character C2 to which the second character C2 is to attach the item object (i.e., an attachment target part chosen according to the user's operation) (step S192). If an item object can be attached to the part, the processor 81 proceeds to step S193. Otherwise, i.e., if an item object cannot be attached to the part, the processor 81 ends the subroutine. It should be noted that step S191 may be executed if the result of the determination in step S192 is positive. Specifically, the highlighting of an item object in step S191 is executed only if a part of the second character C2 to which an item object is to be attached is chosen according to the user's operation, and the item object can be attached to the part.

In step S193, the processor 81 designates one of item objects on a game field as an item object of interest that is to be attached to the attachment target part, and proceeds to the next step. It should be noted that the item object of interest is designated by the above method based on the location of the second character C2 indicated by the second character data Dc. It should be noted that an item object of interest is not present when the second character C2 is at some location, and in that case, in step S193, the processor 81 does not designate an item object of interest.

Next, the processor 81 determines whether or not there is an item object of interest on a game field, based on the result of step S193 (step S194). If there is an item object of interest on a game field, the processor 81 proceeds to step S195. Otherwise, i.e., if there is not an item object of interest on a game field, the processor 81 ends the subroutine.

In step S195, the processor 81 changes a setting of displaying such that an effect image which associates the chosen attachment target part of the second character C2 with the item object of interest is displayed, and the second character C2 is displayed in a translucent form (see FIG. 13), and proceeds to the next step. As a result, in a game image display control process (step S153) which is next executed, a game image is displayed in a display form in which the second character C2 is in the translucent state and the effect image is displayed.

Next, the processor 81 determines whether or not a command to attach the item object has been given, based on the operation data Da (step S196). If a command to attach the item object has been given, the processor 81 proceeds to step S197. Otherwise, i.e., if a command to attach the item object has not been given, the processor 81 ends the subroutine.

In step S197, the processor 81 executes an attachment process, and ends the subroutine. For example, based on the chosen attachment target part of the second character C2 and the item object of interest on the game field, the processor 81 attaches the item object to the attachment target part. Thereafter, the processor 81 changes the state such that the item object is attached to the attachment target part of the second character C2 (see FIG. 12), and updates the attachment data Dg and the item-in-use data Dh based on the change. It should be noted that the processor 81 sets the durability value of the newly attached item object to a predetermined value, and updates the item-in-use data Dh.

It should be noted that in the attachment process of step S197, objects are controlled such that the item object of interest approaches the attachment target part, and thereafter, disappears, and is then attached to the attachment target part.

Referring back to FIG. 18, in step S147, the processor 81 determines whether or not to execute an attack process on the second character C2. For example, if in step S141 the action of attacking another character (e.g., the opponent character EC) has been set for the second character C2, and the second character C2 is performing the attack action, the result of the determination by the processor 81 in step S147 is positive. If the processor 81 determines to execute the attack process on the second character C2, the processor 81 proceeds to step S148. Otherwise, i.e., if the processor 81 does not determine to execute the attack process on the second character C2, the processor 81 proceeds to step S149.

In step S148, the processor 81 executes a second character attack process, and proceeds to step S149. The second character attack process of step S148 will be described below with reference to FIG. 22.

In FIG. 22, the processor 81 determines whether or not the second character C2 is performing the action of attacking using an item object, with reference to the attachment data Dg (step S201). If the second character C2 is performing the action of attacking using an item object, the processor 81 proceeds to step S202. Otherwise, i.e., if the second character C2 is not performing the action of attacking using an item object, the processor 81 proceeds to step S212.

In step S202, the processor 81 determines whether or not the abnormal action flag indicated by the abnormal action flag data Dm is on. If the abnormal action flag is off, the processor 81 proceeds to step S203. Otherwise, i.e., if the abnormal action flag is on, the processor 81 proceeds to step S211.

In step S203, the processor 81 gives an attack effect of the item object used by the second character C2 in an attack to an attack target and thereby causes damage to the attack target, and proceeds to the next step. For example, the processor 81 causes damage to the opponent character EC as an attack target based on a function or performance set for the item object used by the second character C2 in the attack (see FIG. 16), and updates the opponent character data Dd. In addition, the processor 81 provides a setting of displaying so as to display an effect (e.g., a wind attack giving effect (a gust-of-wind blowing effect) or a fire attack giving effect (a fire projecting effect) of an item object) that is caused by the attack to occur from the item object that is used by the second character C1 in the attack. As a result, in a game image display control process (step S153) that is next executed, a game image is displayed in a display form in which a scene is displayed in which the function of the item object is added in the attack using the item object (see FIGS. 12 and 14).

Next, the processor 81 determines whether or not a condition under which the remaining energy of the second character C2 is reduced is satisfied due to the use of the item object by the second character C2 in the attack (step S204). For example, if the attachment data Dg and the item-in-use data Dh indicate that the item object used by the second character C2 in the attack is an energy consuming object, the result of the determination by the processor 81 in step S204 is positive. If the condition under which the remaining energy is reduced is satisfied, the processor 81 proceeds to step S205. Otherwise, i.e., if the condition under which the remaining energy is reduced is not satisfied, the processor 81 proceeds to step S208.

In step S205, the processor 81 reduces the remaining energy of the second character C2 by a predetermined amount, updates the second character data Dc, and proceeds to the next step.

Next, the processor 81 determines whether or not the remaining energy of the second character C2 is zero (i.e., an exhausted state), with reference to the second character data Dc (step S206). If the remaining energy of the item object is zero, the processor 81 proceeds to step S207. Otherwise, i.e., if the remaining energy of the item object is not zero, the processor 81 proceeds to step S208.

In step S207, the processor 81 sets the abnormal action flag on, and proceeds to step S208. For example, the processor 81 sets the abnormal action flag on, and updates the abnormal action flag data Dm.

In step S208, the processor 81 reduces the durability of the item object used by the second character C2 in the attack by a predetermined amount, and proceeds to the next step. For example, the processor 81 reduces the durability of the item object used in the attack, based on the details (the type, power, effectiveness, time, and the like) of the attack performed by the second character C2, and updates the item-in-use data Dh.

Next, the processor 81 determines whether or not the durability of the item object used by the second character C2 in the attack is zero, with reference to the attachment data Dg and the item-in-use data Dh (step S209). If the durability of the item object is zero, the processor 81 proceeds to step S210. Otherwise, i.e., if the durability of the item object is not zero, the processor 81 ends the subroutine.

In step S210, the processor 81 causes the item object to disappear, and ends the subroutine. For example, the processor 81 causes the item object used by the second character C2 in the attack to disappear, and updates the attachment data Dg and the item-in-use data Dh.

Meanwhile, if in step S202 it is determined that the abnormal action flag is on, the processor 81 gives an attack effect of the part of the second character C2 to which the item object is attached for the attack to an attack target and thereby causes damage to the attack target, and ends the subroutine. For example, the processor 81 causes damage to the opponent character EC as an attack target based on attack ability set for the part of the second character C2, and updates the opponent character data Dd.

In addition, if in step S201 it is determined that the item object has not been used in the attack, the processor 81 gives an attack effect of the part of the second character C2 designated as a part for an attack to an attack target and thereby causes damage to the attack target, and ends the subroutine. For example, the processor 81 causes damage to the opponent character EC as an attack target based on attack ability set for the part of the second character C2, and updates the opponent character data Dd.

Referring back to FIG. 18, in step S149, the processor 81 determines whether or not to end the game process. In step S149, the game process is ended, for example, if a condition for ending the game process is satisfied, the user has performed an operation of ending the game process, or the like. If the processor 81 does not determine to end the game process, the processor 81 returns to step S123, and repeats the process. Otherwise, i.e., if the processor 81 determines to end the game process, the processor 81 ends the flowchart. Following this, steps S123 to S149 are repeatedly executed until the processor 81 determines to end the game process in step S149.

In the foregoing, the flow of the game process has been described with reference to FIGS. 18 to 22. During execution of the game process or the like, the process as illustrated in the flowchart of FIG. 23 is executed at predetermined time intervals, whereby a game screen corresponding to an operation is displayed on a display or the like. An interval in which a game image is generated once is referred to as a frame. FIG. 23 illustrates a game process that is executed on a frame-by-fame basis.

In FIG. 23, the processor 81 obtains operation data from the left controller 3, the right controller 4, and/or the main body apparatus 2, updates the operation data Da (step S151), and proceeds to the next step.

Next, the processor 81 executes a process in a frame in the game processes described above with reference to FIGS. 18 to 22 (step S152). Specifically, the process 81 executes a process corresponding to a frame for all or a portion of steps S123 to S149. For example, the processor 81 updates the first character data Db, the second character data Dc, the opponent character data Dd, and the disposed item data De based on a process performed according to the operation data Da, progression of animation, physical calculation and AI control in the virtual space, and the like, and thereby updates characters disposed in the virtual space such as the first character C1, the second character C2, the opponent character EC, and the like, and objects disposed in the virtual space such as item objects. In addition, the processor 81 causes the first character C1 to be equipped with a weapon object or a combination weapon object, and attaches an item object to the second character C2, based on the equipment data Df, the attachment data Dg, and the item-in-use data Dh. In addition, the processor 81 updates the virtual camera data Di according to control based on the operation data Da or control based on the place or position of the first character C1 or the place or position of the second character C2, and the like, and thereby updates the location and/or orientation of a virtual camera for generating a display image.

Next, the processor 81 executes a display control process (step S153). Specifically, the processor 81 performs control to generate an image of the virtual space as viewed from the set virtual camera, and display the virtual space image on the display 12. Thereafter, the processor 81 returns to and repeats step S151.

Thus, in the present example, the user is allowed to choose and operate one of the first character C1 and the second character C2 as a player character. In addition, concerning how to use an item object that is used as a weapon by a player character, an item object can be combined to synthesize a combination weapon object or can be directly attached to a player character, depending on the chosen player character, resulting in various ways of using an item object.

It should be noted that the function of an item object included in a combination weapon object and the function of an item object attached to the second character C2 are exhibited when a player character is performing an attack action in the above examples, and may be exhibited when a player character is performing other actions. For example, the functions may be exhibited when a player character is performing a predetermined action such as the action of moving in the virtual space, the action of cutting a terrain or building in the virtual space, or the action of exploring in the virtual space.

In addition, in the above examples, when the second character C2 uses an energy consuming object, the remaining energy of the second character C2 is consumed. As a result, when the second character C2 uses an energy consuming object, not only energy for causing an energy consuming object to work but also energy for causing the second character C2 itself to perform an action are consumed, and therefore, the movements or actions thereof can be limited in association with each other. In another example, energy for causing an energy consuming object to work and energy for causing the second character C2 itself to perform an action may be set separately. In that case, when the second character C2 uses an energy consuming object, the remaining energy of the energy consuming object is reduced, and energy for causing the second character C2 itself to perform an action is not consumed. In addition, even when the second character C2 consumes energy without use of an energy consuming object, energy for causing an energy consuming object to work is not consumed. As a result, it is possible to reduce a limitation on the second character C2's action in which the function of an energy consuming object is used and the second character C2's action in which the function of an energy consuming object is not used, which is due to an interaction in energy consumption between these actions.

In addition, in the above examples, the first character C1 or the second character C2 uses an item object for an attack action, and may use an item object for other actions. In addition, an item object may be used not only for being combined to synthesize a combination weapon object or being attached to a player character, but also in other forms. For example, the first character C1 or the second character C2 may be allowed to perform the action of moving while carrying an item object itself, or the action of throwing an item object itself. In addition, in the case in which an item object is an energy consuming object, the item object may be able to exhibit a function that is enabled by energy consumption when the item object is used in other actions.

In addition, in the above examples, one of two characters, i.e., the first character C1 and the second character C2, is chosen as a player character, which is operated by the user. There may be three or more characters from which one can be chosen as a player character. In that case, a way in which each character uses an item object may be the same as or different from the way in which the first character C1 and the second character C2 use an item object.

The game system 1 may be any suitable apparatus, including handheld game apparatuses, personal digital assistants (PDAs), mobile telephones, personal computers, cameras, tablet computers, and the like.

In the foregoing, the information process (game process) is performed in the game system 1 by way of example. Alternatively, at least a portion of the process steps may be performed in another apparatus. For example, when the game system 1 can also communicate with another apparatus (e.g., a server, another information processing apparatus, another image display apparatus, another game apparatus, another mobile terminal, etc.), the process steps may be executed in cooperation with the second apparatus. By thus causing another apparatus to perform a portion of the process steps, a process similar to the above process can be performed. The above information process may be executed by a single processor or a plurality of cooperating processors included in an information processing system including at least one information processing apparatus. In the above example, the information processes can be performed by the processor 81 of the game system 1 executing predetermined programs. Alternatively, all or a portion of the above processes may be performed by a dedicated circuit included in the game system 1.

Here, according to the above variation, the present example can be implanted in a so-called cloud computing system form or distributed wide-area and local-area network system forms. For example, in a distributed local-area network system, the above process can be executed by cooperation between a stationary information processing apparatus (a stationary game apparatus) and a mobile information processing apparatus (handheld game apparatus). It should be noted that, in these system forms, each of step S may be performed by substantially any of the apparatuses, and the present example may be implemented by assigning the steps to the apparatuses in substantially any manner.

The order of steps, setting values, conditions for determination, etc., used in the above information process are merely illustrative, and of course, other order of steps, setting values, conditions for determination, etc., may be used to implement the present example.

The above programs may be supplied to the game system 1 not only through an external storage medium, such as an external memory, but also through a wired or wireless communication line. The program may be previously stored in a non-volatile storage device in the game system 1. Examples of an information storage medium storing the program include non-volatile memories, and in addition, CD-ROMs, DVDs, optical disc-like storage media similar thereto, and flexible disks, hard disks, magneto-optical disks, and magnetic tapes. The information storage medium storing the program may be a volatile memory storing the program. Such a storage medium may be said as a storage medium that can be read by a computer, etc. (computer-readable storage medium, etc.). For example, the above various functions can be provided by causing a computer, etc., to read and execute programs from these storage media.

While several example systems, methods, devices, and apparatuses have been described above in detail, the foregoing description is in all aspects illustrative and not restrictive. It should be understood that numerous other modifications and variations can be devised without departing from the spirit and scope of the appended claims. It is, therefore, intended that the scope of the present technology is limited only by the appended claims and equivalents thereof. It should be understood that those skilled in the art could carry out the literal and equivalent scope of the appended claims based on the description of the present example and common technical knowledge. It should be understood throughout the present specification that expression of a singular form includes the concept of its plurality unless otherwise mentioned. Specifically, articles or adjectives for a singular form (e.g., "a", "an", "the", etc., in English) include the concept of their plurality unless otherwise mentioned. It should also be understood that the terms as used herein have definitions typically used in the art unless otherwise mentioned. Thus, unless otherwise defined, all scientific and technical terms have the same meanings as those generally used by those skilled in the art to which the present example pertain. If there is any inconsistency or conflict, the present specification (including the definitions) shall prevail.

As described above, the present example is applicable as a game program, game system, game apparatus, game processing method, and the like that are capable of using an item object in a virtual space in more various ways, and the like.

What is claimed is:

1. A non-transitory computer-readable storage medium having stored therein instructions that, when executed, cause a computer of an information processing apparatus to execute game processing comprising:
controlling a first character disposed in a virtual space based on an operation input, and a second character disposed in the virtual space automatically, in a first mode; and
controlling the second character based on an operation input in a second mode; wherein
the controlling the first character based on an operation input in the first mode includes at least
moving the first character in the virtual space,
generating a combination weapon object by combining a weapon object possessed by the first character with an item object, and
causing the first character to perform an attack action using the combination weapon object or the weapon object, and
the controlling the second character based on an operation input in the second mode includes at least
moving the second character in the virtual space,
attaching the item object to a part of the second character, and
causing the second character to perform an attack action using the part of the second character to which the item object is attached or a part of the second character to which the item object is not attached.

2. The non-transitory computer-readable storage medium according to claim 1, wherein
a plurality of the item objects are disposed in the virtual space, and
the game processing further comprises, in the second mode:
starting an attachment process for the item object according to a command based on an operation input; and
in the attachment process,
designating one of the item objects disposed in the virtual space that is to be attached, based on an operation input;
designating the part to which the item object is to be attached, based on an operation input; and
attaching the designated item object to the designated part.

3. The non-transitory computer-readable storage medium according to claim 2, wherein
the game processing further comprises, in the attachment process:
when the item object is already attached to the part designated for the attachment, removing or deleting the item object already attached from the part; and
attaching, to the part, a newly designated item object to be attached.

4. The non-transitory computer-readable storage medium according to claim 3, wherein
the game processing further comprises, in the attachment process:
executing a rendering process of displaying at least a portion of the second character in a translucent form.

5. The non-transitory computer-readable storage medium according to claim 3, wherein the game processing further comprises, in the attachment process:
when the weapon object or the combination weapon object is designated for the attachment, attaching the weapon object or the combination weapon object to the part designated for the attachment.

6. The non-transitory computer-readable storage medium according to claim 1, wherein
the game processing further comprises, in the first mode:
if, when the first character and the second character have a location relationship indicating that the first character and the second character are located close to each other, a first operation input is performed in the first mode, switching from the first mode to the second mode.

7. The non-transitory computer-readable storage medium according to claim 6, wherein
the controlling the second character based on an operation input in the second mode is performed with the first character sitting on the second character.

8. The non-transitory computer-readable storage medium according to claim 1, wherein
the game processing further comprises:
deleting the weapon object or the combination weapon object based on a durability previously set for the weapon object, and the number of times the first character has performed an attack action using the weapon object or the combination weapon object including the weapon object.

9. The non-transitory computer-readable storage medium according to claim 1, wherein
a plurality of the item objects are disposed in the virtual space, and an effect is set for each item object, and
the game processing further comprises:
when the first character's attack action is performed using the combination weapon object or the second character's attack action is performed using a part thereof to which the item object is attached, generating the effect set for the item object used in the action.

10. The non-transitory computer-readable storage medium according to claim 9, wherein
an energy parameter that is consumed when the effect is generated is set for at least one of the item objects, and
the game processing further comprises:
when the effect of the at least one of the item objects is generated, consuming the energy parameter of the at least one of item objects.

11. The non-transitory computer-readable storage medium according to claim 10, wherein
the energy parameter is set in association with the first character, and
the game processing further comprises:
when the second character performs an action of moving or attacking, further consuming the energy parameter.

12. A game system, comprising:
a processor; and
a memory storing instructions that, when executed, cause the game system to perform operations including:
controlling a first character disposed in a virtual space based on an operation input, and a second character disposed in the virtual space automatically, in a first mode; and
controlling the second character based on an operation input in a second mode;
wherein the controlling the first character based on an operation input in the first mode includes at least
moving the first character in the virtual space,
generating a combination weapon object by combining a weapon object possessed by the first character with an item object, and
causing the first character to perform an attack action using the combination weapon object or the weapon object, and
the controlling the second character based on an operation input in the second mode includes at least
moving the second character in the virtual space,
attaching the item object to a part of the second character, and
causing the second character to perform an attack action using the part of the second character to which the item object is attached or a part of the second character to which the item object is not attached.

13. The game system according to claim 12, wherein
a plurality of the item objects are disposed in the virtual space, and
further, in the second mode,
an attachment process for the item object is executed according to a command based on an operation input, and
in the attachment process,
one of the item objects disposed in the virtual space that is to be attached is designated based on an operation input,
the part to which the item object is to be attached is designated based on an operation input, and
the designated item object is attached to the designated part.

14. The game system according to claim 13, wherein
further, in the attachment process,
when the item object is already attached to the part designated for the attachment, the item object already attached is removed or deleted from the part, and
a newly designated item object to be attached is attached to the part.

15. The game system according to claim 14, wherein
further, in the attachment process, a rendering process of displaying at least a portion of the second character in a translucent form is executed.

16. The game system according to claim 14, wherein
further, in the attachment process, when the weapon object or the combination weapon object is designated for the attachment, the weapon object or the combination weapon object is attached to the part designated for the attachment.

17. The game system according to claim 14, wherein
further, in the first mode, if, when the first character and the second character have a location relationship indicating that the first character and the second character are located close to each other, a first operation input is performed in the first mode, the first mode is switched to the second mode.

18. The game system according to claim 17, wherein
the controlling the second character based on an operation input in the second mode is performed with the first character sitting on the second character.

19. The game system according to claim 12, wherein
further, the weapon object or the combination weapon object is deleted based on a durability previously set for the weapon object, and the number of times the first character has performed an attack action using the weapon object or the combination weapon object including the weapon object.

20. The game system according to claim 12, wherein
a plurality of the item objects are disposed in the virtual space, and an effect is set for each item object, and
further, when the first character's attack action is performed using the combination weapon object or the second character's attack action is performed using a part thereof to which the item object is attached, the effect set for the item object used in the action is generated.

21. The game system according to claim 20, wherein
an energy parameter that is consumed when the effect is generated is set for at least one of the item objects, and
further, when the effect of the at least one of the item objects is generated, the energy parameter of the at least one of item objects is consumed.

22. The game system according to claim 21, wherein
the energy parameter is set in association with the first character, and
further, when the second character performs an action of moving or attacking, the energy parameter is further consumed.

23. A game apparatus, comprising:
a processor; and
a memory storing instructions that, when executed, cause the game apparatus to perform operations including:
controlling a first character disposed in a virtual space based on an operation input, and a second character disposed in the virtual space automatically, in a first mode; and
controlling the second character based on an operation input in a second mode;
wherein
the controlling the first character based on an operation input in the first mode includes at least
moving the first character in the virtual space,
generating a combination weapon object by combining a weapon object possessed by the first character with an item object, and
causing the first character to perform an attack action using the combination weapon object or the weapon object, and
the controlling the second character based on an operation input in the second mode includes at least
moving the second character in the virtual space,
attaching the item object to a part of the second character, and
causing the second character to perform an attack action using the part of the second character to which the item object is attached or a part of the second character to which the item object is not attached.

24. A game processing method for causing a processor of an information processing apparatus to at least:
control a first character disposed in a virtual space based on an operation input, and a second character disposed in the virtual space automatically, in a first mode; and
control the second character based on an operation input in a second mode;
wherein
the controlling the first character based on an operation input in the first mode includes at least
moving the first character in the virtual space,
generating a combination weapon object by combining a weapon object possessed by the first character with an item object, and causing the first character to perform an attack action using the combination weapon object or the weapon object, and the controlling the second character based on an operation input in the second mode includes at least moving the second character in the virtual space, attaching the item object to a part of the second character, and causing the second character to perform an attack action using the part of the second character to which the item object is attached or a part of the second character to which the item object is not attached.

* * * * *